(12) United States Patent
Ivanov

(10) Patent No.: US 11,861,052 B1
(45) Date of Patent: Jan. 2, 2024

(54) DETECTING CONNECTIONS OF UNTRUSTED DEVICES

(71) Applicant: Amazon Technologies, Inc., Seattle, WA (US)

(72) Inventor: Ivaylo Ivanov, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 466 days.

(21) Appl. No.: 17/115,987

(22) Filed: Dec. 9, 2020

(51) Int. Cl.

| | |
|---|---|
| G06F 21/82 | (2013.01) |
| G06F 21/57 | (2013.01) |
| G06F 21/44 | (2013.01) |
| G06F 21/78 | (2013.01) |
| G06F 21/60 | (2013.01) |
| G06N 20/00 | (2019.01) |

(52) U.S. Cl.
CPC ............. *G06F 21/82* (2013.01); *G06F 21/44* (2013.01); *G06F 21/577* (2013.01); *G06F 21/606* (2013.01); *G06F 21/78* (2013.01); *G06N 20/00* (2019.01)

(58) Field of Classification Search
CPC ........ G06F 21/82; G06F 21/44; G06F 21/577; G06F 21/606; G06F 21/78; G06N 20/00
See application file for complete search history.

(56) References Cited

U.S. PATENT DOCUMENTS

| | | | |
|---|---|---|---|
| 10,169,567 B1 * | 1/2019 | Pentz ...................... G06F 21/44 |
| 2017/0046540 A1 * | 2/2017 | Bytheway ............... G06F 1/266 |
| 2021/0051163 A1 * | 2/2021 | Kublanov ........... H04L 63/1416 |
| 2021/0097210 A1 * | 4/2021 | Atobe ................. G06F 11/3058 |

* cited by examiner

*Primary Examiner* — Amie C. Lin
(74) *Attorney, Agent, or Firm* — Lee & Hayes P.C.

(57) ABSTRACT

A computing device with a hardware port may include a port meter that is electrically connected to the hardware port and configured to measure an electrical parameter associated with the hardware port. The port meter can be used to determine a value of the electrical parameter associated with the hardware port upon determining that an external device is connected to the hardware port. An operating system of the computing device receives the value measured by the port meter, and processes the value received from the port meter to determine whether an untrusted device is connected to the hardware port. If an untrusted device is connected to a hardware port, an action can be performed by the computing device, the action being aimed at protecting sensitive data otherwise accessible to the computing device.

18 Claims, 7 Drawing Sheets

DETECTING CONNECTIONS OF UNTRUSTED DEVICES

BACKGROUND

Many service providers utilize call centers to handle electronic queries from their customers. Customer service agents (CSAs) are hired as employees of the service provider, or as contractors, to handle customer queries involving issues such as returns and exchanges, technical support, and billing, to name a few. It is not uncommon for a service provider to employ thousands of CSAs to handle such queries.

A service provider typically issues a CSA specialized computing equipment to handle electronic customer queries. For example, a CSA may be issued a specialized computing device (e.g., a small desktop computer) that exposes multiple USB ports. The CSA might connect a universal serial bus (USB) headset with a microphone to their computing device, which can be used to take phone calls from customers. Other USB ports of the computing device may be utilized for connecting additional peripheral devices, such as a keyboard, a mouse, and the like. The headset used by a CSA may also include a splitter with an additional USB connector. This additional USB connector is typically used to connect an additional USB headset to the computing device via the headphone splitter so that a supervisor can listen to customer calls while the supervisor's microphone is muted.

With the various USB ports on the CSA's equipment, there is a risk of illicit devices being connected to those ports and used in a way that compromises the security of sensitive customer data. For example, it is possible to connect an illicit recording device to the additional connector on the headset splitter of the CSA's headset in order to surreptitiously record customer conversations. This illicit activity goes undetected with existing technology. Currently, it is the responsibility of a human (e.g., a supervisor, the CSA, a co-worker, etc.) to catch a malicious person in the act of stealing customer data. Today, with a larger number of CSAs working out of their own homes (as opposed to working in corporate offices), monitoring the use of CSA-issued equipment has become a difficult task. In addition, it is also difficult to monitor whether a CSA is working from their actual home, or whether the CSA has transported company-issued computing equipment to a public setting, such as a coffee shop, which is inherently less-secure than a home office, let alone a corporate office. Accordingly, in today's call center landscape, there is an increased risk of compromising the security of customer data. The disclosure made herein is presented with respect to these and other considerations.

BRIEF DESCRIPTION OF THE DRAWINGS

FIG. 3 also illustrates example tables that specify predetermined value ranges that may be used to implement the techniques described herein.

DETAILED DESCRIPTION

Figure 1:
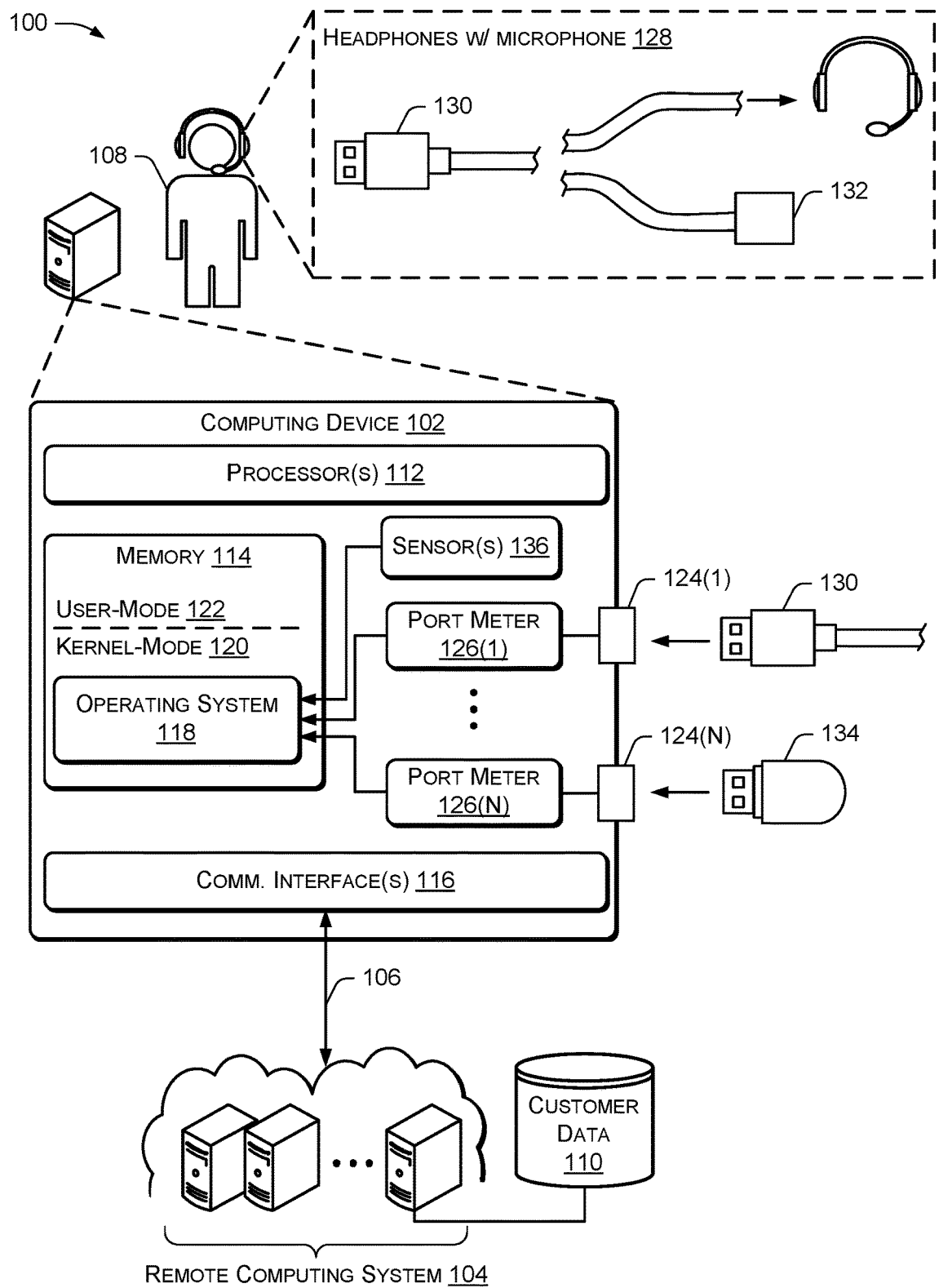
FIG. 1 illustrates an example system including an example computing device configured to determine whether an untrusted device is connected to a hardware port of the computing device, and a remote computing system with which the computing device may establish a secure, authenticated computing session.

Described herein are, among other things, techniques, devices, and systems for determining whether an untrusted device is connected to a hardware port of a computing device. Also described herein are techniques, devices, and systems for determining whether a computing device is being used in an untrusted way and/or location. An action may be taken by the computing device and/or by a remote computing system if it is determined that an untrusted device has been connected to a hardware port of the computing device, and/or if it is determined that the computing device is being used in an untrusted way and/or location. The action performed by the computing device, for example, may include sending a notification to the remote computing system, among other possible actions described herein. Regardless of the type of action taken, the action is aimed at ensuring that the security of sensitive data, such as customer data, remains uncompromised, protected, and secure.

To illustrate, a computing device may be issued to a customer service agent (CSA) who handles customer queries on behalf of a service provider. The CSA may utilize the computing device to communicate electronically with customers, such as by using the computing device to establish a secure, authenticated computing session with a remote computing system. The computing device may include one or more hardware ports that are available to the CSA to connect an external device, such as headphones, to the computing device. When the CSA establishes authenticates a computing session in order to interact with customers using the computing device, the computing device, while engaged in the authenticated computing session, is configured to determine if and when an untrusted device is connected to the hardware port. An "untrusted device," in the context of the present disclosure, may include, without limitation, a recording device (e.g., an audio recording device, video recording device, etc.), a keyboard emulator, a mouse emulator, a key logger, or the like. If and when a connection of an untrusted device is detected, an action can be taken by the computing device, such as a remedial action that notifies a remote computing system, and/or that disables the computing device or a component thereof, such as disabling a communications interface to render the computing device incapable of communicating with the remote computing system any further. In this manner, sensitive customer data that is otherwise accessible to a user via a secure, authenticated computing session remains protected by taking remedial action in response to determining a connection of an untrusted device to a hardware port of the computing device, and/or in response to determining that the computing device is otherwise being used in an untrusted way and/or location.

In some implementations, the computing device is equipped with one or more port meters. An individual port meter may be disposed within (or internal to) the computing device, such as by being mounted on a printed circuit board (PCB) that is internal to the computing device, or the individual port meter may be disposed within a hardware port (e.g., a female hardware port). An individual port meter is electrically connected to a corresponding hardware port, such as a universal serial bus (USB) port, of the computing device. Through this electrical connection, the port meter is configured to measure an electrical parameter(s) associated with the hardware port. For example, an individual port meter may be configured to measure an impedance parameter, a voltage parameter, and/or a current parameter associated with the corresponding hardware port. These types of electrical parameters will change if an external device is connected to the hardware port. Said another way, the particular value of the electrical parameter associated with the hardware port (which is measurable by the port meter) varies in response to different types of external devices being connected to the hardware port. For example, when a trusted device, such as a set of headphones, is connected to the hardware port, the electrical parameter(s) associated with hardware port resolves to a first value(s), and when an untrusted device, such as an illicit recording device, is connected to the hardware port, the electrical parameter(s) associated with the hardware port resolves to a second value(s), the second value(s) different than the first value(s). In this way, the value(s) of the electrical parameter(s) measured by the port meter is/are indicative of the type of external device that is connected to the hardware port. An operating system of the computing device receives the value(s) measured by the port meter(s), and processes (e.g., analyzes) the value(s) received from the port meter(s) to determine whether an untrusted device(s) is/are connected to the hardware port(s). If an untrusted device is connected to a hardware port, an action can be performed by the computing device, the action being aimed at protecting customer data, as described herein.

Implementations of the techniques and systems described herein can improve existing technologies (e.g., data security technologies). In particular, the techniques and systems described herein allow for detecting connections of potentially malicious devices, which may be used by attackers to target customers and/or to target customer data associated with those customers and maintained by a service provider. The detection systems and techniques described herein ensure that the integrity and the security of customer data remains uncompromised, especially in a context where users are issued computing equipment that is used to perform a task(s) with respect to customers of a service provider, and where the use of that computing equipment to perform the assigned task(s) provides the users with access to sensitive customer data maintained by the backend system of the service provider. As computing devices with the described detection capabilities are deployed in the field, patterns and trends can also be identified in order to detect new types of untrusted devices that are being used by malicious actors. In this manner, connections of new types of untrusted devices to hardware ports of user computing devices can be detected, and the relevant parties can be alerted, among other possible actions that can be taken. In addition to these benefits, the security of customer data and/or resources is inherently improved by the techniques and systems described herein; namely, by detecting and thwarting potentially malicious device connections and/or detecting when a computing device is being used in an untrusted way or location before sensitive customer data can be accessed.

In addition to the aforementioned benefits, computing resources, such as processing resources, memory resources, networking resources, power resources, and the like, may also be conserved by aspects of the techniques and systems described herein. Customer experience is also improved by the techniques and systems described herein by improving the security of customer data and/or resources, which gives customers of a service provider piece-of-mind that their data (e.g., phone numbers, email addresses, credit card numbers, etc.) is less likely to be compromised by a data breach.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 illustrates an example system 100 including an example computing device 102 configured to determine whether an untrusted device is connected to a hardware port of the computing device 102, and a remote computing system 104 with which the computing device 102 may establish a secure, authenticated computing session 106, according to some configurations. The computing device 102 shown in FIG. 1 (sometimes referred to herein as a "user computing device 102," a "computer device 102," or an "electronic device 102") may can be implemented as any type and/or any number of computing devices, including, without limitation, a personal computer (PC), a laptop computer, a desktop computer, a portable digital assistant (PDA), a mobile phone, tablet computer, a set-top box, a game console, a server computer, a wearable computer (e.g., a smart watch, headset, etc.), or any other electronic device that can transmit data to, and receive data from, other devices. In an illustrative example, a user 108 of the computing device 102 may represent a customer service agent (CSA) who handles queries from customers of a service provider. The service provider may own and/or operate the remote computing system 104. The user 108 may be located at any suitable location (e.g., in a corporate office, in a home office, etc.) while using the computing device 102 to handle customer queries, such as by taking phone calls and/or video calls from customers, answering questions using an instant messaging service and/or electronic mail (e-mail) application, a social media platform, or any similar electronic messaging or communication service.

As part of handling customer queries on behalf of the service provider, the user 108 may connect the computing device 102 to the remote computing system 104 to establish a secure, authenticated computing session 106 over any suitable network, such as a wide area communication network ("WAN") (e.g., the Internet), a cellular network, an intranet or an Internet service provider ("ISP") network or a combination of such networks. In some implementations, the authenticated computing session 106 may represent an encrypted session. In some implementations, a virtual private network (VPN) is utilized to establish the authenticated computing session 106 between the computing device 102 and the remote computing system 104, but any suitable type of network access technology can be utilized to establish the session 106. In some embodiments, the user 108 and/or the computing device 102 and/or another hardware authentication device connected to the computing device 102 provides security credentials (e.g., usernames, passwords, tokens, etc.) to authenticate the session 106. In some implementations, Identity and Access Management (IAM)-based access policies are used to establish the authenticated computing session 106, which may involve additional checks (e.g., checks regarding roles, permissions, etc.) before allowing the computing device 102 to access the remote computing system 104, such as to access data, including sensitive data (e.g., customer data 110), to field customer queries. As used herein, "sensitive data" means data that is to be protected against unwarranted disclosure, which may be for legal, ethical, proprietary or other reasons. Examples of sensitive data include, without limitation, customer data 110 (e.g., personal identifiable information (PII)), intellectual property and trade secret data, operational and inventory data, and the like. The customer data 110 shown in FIG. 1 may include, without limitation, phone numbers, email addresses, credit card numbers, account numbers, purchase histories, and the like. Thus, the customer data 110 is sensitive in nature.

In the illustrated implementation, the computing device 102 includes one or more processors 112, memory 114 (e.g., computer-readable media 114), and one or more communications interfaces 116. In some implementations, the processors(s) 112 may include a central processing unit (CPU)(s), a graphics processing unit (GPU)(s), both CPU(s) and GPU(s), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 112 may possess its own local memory, which also may store program modules, program data, and/or one or more operating systems.

The memory 114 may include volatile and nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, compact disk (CD)-ROM, digital versatile disks (DVD) or other optical storage, magnetic cassettes, magnetic tape, magnetic disk storage or other magnetic storage devices, redundant array of inexpensive disks (RAID) storage systems, or any other medium which can be used to store the desired information and which can be accessed by a computing device. The memory 114 may be implemented as computer-readable storage media (CRSM), which may be any available physical media accessible by the processor(s) 112 to execute instructions stored on the memory 114. In one basic implementation, CRSM may include RAM and Flash memory. In other implementations, CRSM may include, but is not limited to, ROM, EEPROM, or any other tangible medium which can be used to store the desired information and which can be accessed by the processor(s) 112.

The communication interface(s) 116 facilitates a connection to a network and/or to one or more remote computing systems, such as the remote computing system 104. The communication interface(s) 116 may implement one or more of various wireless technologies, such as Wi-Fi, Bluetooth, radio frequency (RF), and so on. It is to be appreciated that the communication interface(s) 116 may additionally, or alternatively, include physical ports to facilitate a wired connection to a network, a connected peripheral device, or a plug-in network device that communicates with other wireless networks.

In general, the computing device 102 may include logic (e.g., software, hardware, and/or firmware, etc.) that is configured to implement the techniques, functionality, and/or operations described herein. The memory 114 can include various modules, such as instructions, datastores, and so forth, which may be configured to execute on the processor(s) 112 for carrying out the techniques, functionality, and/or operations described herein. An example functional module in the form of an operating system(s) 118 is shown in FIG. 1. The operating system(s) 118 may be configured to manage hardware within, and coupled to, the computing device 102 for the benefit of other modules. The operating system 118 may execute in kernel mode 120 (or kernel space 120) of the computing device 102. According to some implementations, the operating system(s) 118 comprises the Linux operating system. According to other implementations, the operating system(s) 118 comprises the Windows® operating system from Microsoft Corporation of Redmond, Washington. According to further implementations, the operating system(s) 118 comprises the Unix operating system or one of its variants. It should be appreciated that other operating systems can also be utilized.

Various applications may be executed in user mode 122 (or user space 122) of the computing device 102, such as word processing applications, messaging applications, and the like. The kernel mode 120 and the user mode 122 correspond to respective protection domains—also known as rings—that protect data and functionality of the computing device 102 from faults and malware. Typically, a user mode, such as the user mode 122, is associated with the outermost ring and the least level of privileges to access memory and functionality. This ring is often referred to as "ring 3" and includes many application processes. A kernel mode, such as the kernel mode 120, is associated with an inner ring (sometimes the innermost ring, although in modern computing devices there is sometimes an additional level of privilege, a "ring 1") and a higher level of privileges to access memory and functionality. This ring is often referred to as "ring 0" and typically includes operating system 118 processes.

The computing device 102 of FIG. 1 is further shown as including hardware ports 124(1) to 124(N), where "N" is any suitable integer. Although multiple hardware ports 124 are depicted in FIG. 1, it is to be appreciated that the computing device 102 may include a single hardware port 124, in some implementations. The individual hardware ports 124 (sometimes referred to herein as "physical ports 124") are configured to receive a connector of an external device. As the name implies, an "external device," in this context means a device that is external to the computing device 102. Accordingly, the hardware ports 124 may be accessible via respective orifices defined in a housing of the computing device 102, for example. In some implementations the hardware ports 124, or a subset of the hardware ports 124, represent one or more universal serial bus (USB) ports that are each configured to receive a connector of an external USB device. In some implementations the hardware ports 124, or a subset of the hardware ports 124, represent one or more high-definition multimedia interface (HDMI) ports that are each configured to receive a connector of an external HDMI device. These types of hardware ports are exemplary, and other types of hardware ports that use other technologies and interfaces known to a person having ordinary skill in the art are contemplated. Example types of hardware ports 124 include, without limitation, USB ports (USB Type-A, USB Type-B, USB Type-C, USB 2.0, USB 3.0, USB 3.1 Gen 1, USB 3.1 Gen 2, micro USB, mini USB, etc.), HDMI ports, Ethernet ports, audio ports (e.g., a 3.5 mm audio jack), DisplayPort/mini DisplayPort, digital visual interface (DVI) ports, micro Secure Digital (SD) card readers, SD card readers, Thunderbolt 3 ports, video graphics array (VGA) ports, serial ATA (SATA) ports, or any combination thereof.

The computing device 102 may further include port meters 126(1) to 126(N). In some implementations, there may be one port meter 126 for every hardware port 124 that is being monitored to detect a connection of an untrusted device to that hardware port 124. In other implementations, there may be one port meter 126 associated with multiple hardware ports 124. For example, a single port meter 126 may utilize a switch and/or a multiplexer to scan multiple hardware ports 124 in series to measure an electrical parameter(s) associated with the multiple hardware ports 124. For instance, a port meter 126 may be configured to measure the electrical parameter(s) associated with a first hardware port 124(1), and then measure the electrical parameter(s) associated with a second hardware port 124(2), and so on and so forth for any suitable number of hardware ports 124(1) to 124(N). Individual port meters 126 may be disposed within (or internal to) the computing device 102 in that they are at least substantially enclosed by the housing of the computing device 102, or an individual port meter 126 may be disposed within a corresponding hardware port 124 (e.g., a female hardware port). Furthermore, individual port meters 126 are electrically connected to a corresponding hardware port 124 and configured to measure one or more electrical parameters associated with the hardware port 124. The electrical parameter(s) measured by the port meters 126 may include, without limitation, an impedance parameter, a voltage parameter, and/or a current parameter. The operating (or measurement) ranges of the port meters 126 with respect to each type of electrical parameter may vary depending on the application of the port meter 126 and/or the type of hardware port (e.g., USB, HDMI, etc.). In some examples, the port meter 126 is configured to measure an impedance parameter (sometimes referred to herein as a "resistance parameter") within a range of about 1 ohm (Ω) to 9999.9Ω. In some examples, the port meter 126 is configured to measure a voltage parameter within a range of about 3.7 volts (V) to 40 V. In some examples, the port meter 126 is configured to measure a current parameter within a range of about 0 amperes (A) to 4 A.

The port meters 126 may be configured to take an individual measurement at any suitable time, such in response to an instruction (e.g., from the operating system 118) or an event (e.g., a connection of an external device to the hardware port 124), and/or at any suitable frequency or schedule. In some implementations, the port meters 126 are configured to periodically measure the electrical parameter(s) associated with a corresponding hardware port 124 to generate a series of values (e.g., impedance values, voltage values, and/or current values). In some implementations, this periodic measurement interval may be an interval of about 100 milliseconds (ms), meaning that the port meters 126 are configured to measure the electrical parameter(s) about every 100 ms. In some implementations, an individual port meter 126 is configured to measure (e.g., to start measuring on a periodic basis) the electrical parameter(s) in response to determining (e.g., detecting) that an external device is connected to the corresponding hardware port 124. That is, the port meter 126(1) may wait to measure (or refrain from measuring) the electrical parameter(s) associated with the hardware port 124(1) until it is determined that an external device is connected to the hardware port 124(1). In other implementations, the port meter 126(1) may measure the electrical parameter(s) continually (e.g., periodically), but the port meter 126(1) may take measurements at a different (e.g., lower/reduced) frequency prior to an external device being connected to the hardware port 124(1), and after an external device is connected to the hardware port 124(1), the frequency at which the port meter 126(1) measures the electrical parameter(s) may increase (e.g., to 100 ms measurement intervals).

In some implementations, the port meters 126 are configured to send the value(s) of the measured electrical parameter(s) to the operating system 118. The value(s), or data indicative of the value(s), can be sent from the port meters 126 to the operating system 118 in real-time, such as by sending the data as the electrical parameter(s) is/are measured. Additionally, or alternatively, the data indicative of the value(s) of the electrical parameter(s) may be sent in batches (e.g., multiple sequentially-measured values at a time), or at any suitable frequency or schedule. The computing device 102 may include a hardware bus that connects the port meters 126 to the operating system 118 in order to send the output signals that carry the data indicative of the value(s) measured by the port meters 126. The operating system 118 is configured to receive, via the hardware bus, the value(s) (e.g., the output signals, the data indicative of the value(s), etc.) of the electrical parameter(s) measured by the port meters 126. In some implementations, the operating system 118 may log the values of the electrical parameter(s)

it receives in memory 114 (e.g., in a data store) so that the values can be accessed at a later time. The operating system 118, or any other suitable component of the computing device 102, may send the logged values of the electrical parameter(s) to the remote computing system 104. For example, the values may be sent to the remote computing system 104 in real-time (e.g., streamed to the remote computing system 104), in batches, or at any suitable frequency or schedule.

The operating system 118 may be further configured to process (e.g., analyze) the value(s) received from the port meter(s) 126, such as to determine whether an untrusted device(s) is/are connected to a hardware port(s) 124. In some examples, the remote computing system 104 determines whether an untrusted device(s) is/are connected to any of the hardware port(s) 124 based on a stream of real-time value(s) received from the computing device 102. That is, the computing device 102 may be configured to send a value(s) of the electrical parameter(s) to the remote computing system 104 in real-time, and the remote computing system 104 may process the value(s) to determine whether an untrusted device(s) is/are connected to any of the hardware port(s) 124 based on the value(s), and the remote system 104 may send a response (e.g., an instruction) to the computing device 102 that informs the operating system 118 as to whether an untrusted device connection has been detected by the remote computing system 104, or the remote system 104 may refrain from notifying the computing device 102 and may perform an action independently. Many of the examples described herein involve local processing of the electrical parameter value(s) by the operating system 118, but it is to be appreciated that any of the logic of the computing device 102 described herein can be included in the remote computing system 104 for purposes of remotely processing the value(s) measured by the port meters 126.

The determination of an untrusted device connection based on the measured electrical parameter(s) can be made in various ways using various techniques or algorithms. For example, the operating system 118 may have access (e.g., in local memory 114 of the computing device 102) to one or more predetermined ranges of values (sometimes referred to herein as "baselines") to which the measured value(s) of the electrical parameter(s) can be compared, and, based on a result of the comparison (e.g., an amount of deviation, whether a value is within or outside of a predetermined range, etc.), the operating system 118 can determine whether an untrusted device(s) is/are connected to a hardware port(s) 124. For example, a predetermined range of values may be associated with a trusted device, such as a set of headphones 128 issued by a service provider to the user 108. The user 108 might use the headphones 128 to speak to customers over the phone. The set of headphones 128 may include a built-in microphone, and a cord or cable with a port connector 130 at one end of the cord, which is configured to be connected to a hardware port 124 of the computing device 102. For example, FIG. 1 illustrates that the port connector 130 of the headphones 128 is configured to be connected to the hardware port 124(1) of the computing device 102, or to any of the hardware ports 124 for that matter. In some examples, the hardware port 124(1) is a USB port and the port connector 130 is a USB connector. If the user 108 connects the port connector 130 of the headphones 128 to the hardware port 124(1), the port meter 126(1) may measure the electrical parameter(s) (e.g., the impedance parameter, the voltage parameter, and/or the current parameter), and may send a value(s) corresponding to the measured electrical parameter(s) to the operating system 118. The operating system 118 may compare the received value(s) to one or more predetermined ranges of values associated with the trusted set of headphones 128, and, based on the comparison, the operating system 118 may determine that the measured value(s) falls within the predetermined range(s) of values associated with the trusted set of headphones 128. In this scenario, the operating system 118 determines that a trusted device is connected to the hardware port 124(1). Other techniques for making this determination are contemplated, however, such as using a machine learning model(s), or comparing the measured electrical parameter value(s) to an electrical parameter value(s) previously measured by the port meter 126(1) at an earlier point in time.

The headphones 128 are shown in FIG. 1 as including a splitter with an additional connector 132. As mentioned above, this additional connector 132 (e.g., a USB connector) may be used to connect an additional external device to the computing device 102, such as an additional headset of a supervisor who can listen to customer calls while the supervisor's microphone is muted. Accordingly, the operating system 118 may have access to another predetermined range(s) of values (or baseline(s)) associated with the supervisor's headphones (which is another example of a trusted device), and if the supervisor's headphones are connected to the additional connector 132, the port meter 126(1) measures the electrical parameter(s) to generate a value(s) of the electrical parameter, and the operating system 118 receives the value(s) and compares the value(s) to the predetermined range(s) of values associated with the trusted headphones of the supervisor to determine that a trusted device is connected to the hardware port 124(1).

If an untrusted device is connected to a hardware port 124, the operating system 118 may determine that such an untrusted device is connected based on the measured electrical parameter(s) value(s) falling outside of the predetermined value range(s) of the trusted device(s) known to the operating system 118. For example, if an illicit recording device (e.g., an audio recording device) is connected to the additional connector 132 of the headphone splitter (or to the hardware port 124(1) directly), the port meter 126(1) measures the electrical parameter(s) to generate a value(s), and the operating system 118 determines that the value(s) of the electrical parameter(s) is/are not within a predetermined range(s) of values associated with a trusted device, such as the headphones 128 and/or the supervisor's headphones. It is to be appreciated that any hardware port 124 (e.g., all of the hardware ports 124 of the computing device 102) can be configured in this way because an illicit and/or trusted device can be connected to any of the hardware ports 124. In an illustrative example, the electrical parameter is an impedance parameter, and the port meter 126(1) measures the impedance parameter associated with the hardware port 124(1) to determine a value of the impedance parameter. The operating system 118 has access to a predetermined range of impedance values associated with a trusted device, such as the headphones 128, and the operating system 118 determines that the value of the impedance parameter received from the port meter 126(1) is not within that predetermined range of values to make the determination that an untrusted device (e.g., a recording device) is connected to the hardware port 124(1). Additionally, or alternatively, this type of illicit recording device may be a known type of untrusted device, and the operating system 118 may have access to a predetermined range of values (e.g., impedance values) associated with this known type of untrusted device. In this scenario, the operating system 118 may determine that the untrusted recording device is connected to the hardware port

124(1) if the value of the electrical parameter(s) received from the port meter 126(1) is within that predetermined range of values. In this case, the operating system 118 may be able to determine the type of device that is connected to the hardware port 124(1) because that type of untrusted device is a known type of untrusted device. Otherwise, the operating system 118 may deduce that an unknown type of untrusted device is connected to the hardware port 124(1) if the value(s) of the measured electrical parameter(s) falls outside of a predetermined range(s) of values associated with a known trusted device.

An illicit recording device (e.g., an audio recording device) is one type of untrusted device that may be determined to be connected to a hardware port 124 using the techniques described herein. Another type of illicit external device that may be detected is a USB keyboard emulator 134, such as a USB Rubber Ducky sold by Hak5® LLC of San Francisco, CA. For example, the USB keyboard emulator 134 may be connected to the hardware port 124(N) (e.g., a USB port), and the keyboard emulator 134 may execute a script to send keystrokes directly to the operating system 118 in an attempt to emulate a legitimate keyboard. A malicious attacker may use the keyboard emulator 134 in an attempt to exfiltrate sensitive data, such as the customer data 110, after the user 108 authenticates a session 106 with the remote computing system 104. Another type of illicit external device that may be detected is a USB mouse jiggler, which may emulate mouse movements to prevent an automatic screen lockout of the computing device 102 from occurring. This may allow malicious attackers to gain access to the remote computing system 104 when the user 108 walks away from the computing device 102, even for a short period of time. Yet another type of illicit external device that may be detected is a key logger, which is a device that logs the keystrokes made by the user 108 and sends the logged keystrokes via a WiFi interface to another device, such as a device of a malicious attacker who can then see what the user 108 is typing. Some of these illicit devices may be connected to a hardware port 124 without a legitimate user of the computing device 102 even knowing that the illicit device has been connected (e.g., due to the small size of some of these devices).

If the untrusted keyboard emulator 134, for example, is connected to the hardware port 124(N), the operating system 118 may determine that an untrusted device is connected to the hardware port 124(N) based on the measured electrical parameter(s) value(s) associated with the hardware port 124(N) falling outside of a predetermined value range(s) associated with a trusted device(s) known to the operating system 118. For example, in response to determining that an external device is connected to the hardware port 124(N), the port meter 126(N) measures the electrical parameter(s) associated with the hardware port 124(N) to generate a value(s), and the operating system 118 determines that the value(s) of the electrical parameter(s) is/are not within a predetermined range(s) of values associated with a trusted device, such as the headphones 128 and/or the supervisor's headphones. Again, in an illustrative example where the electrical parameter is an impedance parameter, the port meter 126(N) measures the impedance parameter associated with the hardware port 124(N) to determine a value of the impedance parameter. The operating system 118 has access to a predetermined range of impedance values associated with a trusted device, such as the headphones 128, and the operating system 118 determines that the value of the impedance parameter received from the port meter 126(N) is not within that predetermined range of values to make the determination that an untrusted device (e.g., the keyboard emulator 134) is connected to the hardware port 124(N). Additionally, or alternatively, this type of illicit keyboard emulator device may be a known type of untrusted device, and the operating system 118 may have access to a predetermined range of values (e.g., impedance values) associated with this known keyboard emulator 134. In this scenario, the operating system 118 may determine that the untrusted keyboard emulator 134 is connected to the hardware port 124(N) if the value of the electrical parameter(s) received from the port meter 126(N) is within that predetermined range of values associated with the untrusted keyboard emulator 134. In this case, the operating system 118 may be able to determine the type of device that is connected to the hardware port 124(N) because that type of untrusted device is a known type of untrusted device. Otherwise, the operating system 118 may deduce that an unknown type of untrusted device is connected to the hardware port 124(N) if the value(s) of the measured electrical parameter(s) falls outside of a predetermined range(s) of values associated with a known trusted device.

Any suitable type of action aimed at protecting the customer data 110 can be performed (or taken) by the computing device 102 (e.g., by the operating system 118) and/or the remote computing system 104 in response to determining that an untrusted device is connected to a hardware port 124. For example, the computing device 102 may send, to the remote computing system 104, a notification indicative of a connection of the untrusted device to the hardware port 124. This notification, when received by the remote computing system 104, may allow for a remedial action to be taken, and/or it may apprise relevant personnel about the connection event. In some implementations, the user 108 may be contacted by the service provider about the connection event to determine whether there has been a false positive detection of an untrusted device. In some implementations, the service provider may flag it as a risk signal and continue monitoring the computing device 102. In some implementations, the action performed in response to detecting a connection of an untrusted device to a hardware port 124 may be to disable the computing device 102. For example, the operating system 118 may reboot the computing device 102 into a mode of operation where it cannot be used by the user 108 for handling customer queries. As another example, the operating system 118 may shut down (e.g., power off) the device 102 and may not allow the user 108 to establish an authenticated computing session 106 on a subsequent boot attempt. In some implementations, the action performed in response to detecting a connection of an untrusted device to a hardware port 124 may be to disable a component(s) of the computing device 102, such as the communications interface(s) 116, thereby preventing incoming and/or outgoing traffic to and/or from the computing device 102. In this manner, disabling the communications interface(s) 116 may prevent further access to the customer data 110 by the computing device 102.

As depicted in FIG. 1, the computing device 102 may further include one or more sensors 136 that is/are configured to sense one or more parameters associated with the computing device 102. In some examples, the value(s) of the sensed parameter(s) may be indicative of a way in which, and/or a location at which, the computing device 102 is being used. To illustrate, the user 108 may represent a CSA who is issued the computing device 102 to use at a home office to work from home. The temperature inside the home office may remain relatively constant, such as within a range of about 65° Fahrenheit (F) to about 75° F. Accordingly, the sensor(s) 136 may represent a temperature sensor (e.g., a thermistor sensor) that is configured to sense the temperature of the environment surrounding the computing device 102. The sensor 136 can sense the temperature of the environment and send a value(s) of the measured temperature to the operating system 118 via the hardware bus of the computing device 102. The sensor 136 may be configured to sense the temperature at any suitable time, such in response to any suitable instruction (e.g., from the operating system 118) or event, and/or at any suitable frequency or schedule. In some implementations, the sensor 136 is configured to periodically sense the temperature to generate a series of values (e.g., temperature values). If the operating system 118 determines that the sensed temperature value(s) falls outside of a predetermined range of values (e.g., about 65° F. to about 75° F.), the operating system 118 may determine that the computing device 102 has likely been moved to another environment, such as outside of the user's 108 home office. This may be a risk signal that is treated as a supplementary signal to the detection of an untrusted device 102 being connected to a hardware port 124, or it may be used independently as a signal that indicates the computing device is likely being used in an untrusted location. In some examples, the sensor 136 is configured to measure a temperature parameter within a range of about −10° Celsius (C) to 50° C. (or 14° F. to 122° F.). In some implementations, the sensor 136 is configured to sense the temperature within the computing device 102 (e.g., inside the housing of the computing device 102), the temperature of an electronic component (e.g., a temperature of a processor, such as a CPU), and/or the temperature of, or near, a hardware port 124 to help detect a connection of an untrusted device to the hardware port 124. For instance, based on a connection of a device to a hardware port 124, the sensor 136 may sense a temperature within the device 102 (e.g., a temperature of, or near, the hardware port 124) to generate a temperature value, and the operating system 118 may determine that the temperature value is outside of a predetermined range of temperature values to determine that an untrusted device has been connected to the hardware port 124. For instance, a connection of an untrusted device to a hardware port 124 may cause the internal temperature of the device 102 (and/or the temperature an electronic component) to change/deviate from a baseline (e.g., change to a temperature outside of a predetermined range of temperature values). In some implementations, the sensed temperature within the device 102 (e.g., of, or near, the hardware port 124) is used as a corroborating signal to corroborate an out-of-range electrical parameter measured by the port meter 126, and the operating system 118 may determine, with higher confidence, that an untrusted device is connected to the hardware port 124 if it detects both (i) an out-of-range electrical parameter value and (ii) an out-of-range temperature parameter value.

As another example, the relative humidity inside the home office of the user 108 may also remain relatively constant. Accordingly, the sensor(s) 136 may represent a humidity sensor that is configured to sense the humidity of the environment surrounding the computing device 102. The sensor 136 can sense the humidity and send a value(s) of the measured humidity to the operating system 118 via the hardware bus of the computing device 102. The sensor 136 may be configured to sense the humidity at any suitable time, such in response to any suitable instruction (e.g., from the operating system 118) or event, and/or at any suitable frequency or schedule. In some implementations, the sensor 136 is configured to periodically sense the humidity to generate a series of values (e.g., humidity values). If the operating system 118 determines that the sensed humidity value(s) falls outside of a predetermined range of values, the operating system 118 may determine that the computing device 102 has likely been moved to another environment, such as outside of the user's 108 home office. This too may be a risk signal that is treated as a supplementary signal to the detection of an untrusted device being connected to a hardware port 124, or it may be used independently as a signal that indicates the computing device 102 is likely being used in an untrusted location. In some examples, the sensor 136 is configured to measure a humidity parameter within a range of about 20% Relative Humidity (RH) to 90% RH. In some implementations, the sensor 136 is configured to sense the humidity within the computing device 102 (e.g., inside the housing of the computing device 102), and/or the humidity near a hardware port 124 to help detect a connection of an untrusted device to the hardware port 124. For instance, based on a connection of a device to a hardware port 124, the sensor 136 may sense a humidity within the device 102 (e.g., a humidity near the hardware port 124) to generate a humidity value, and the operating system 118 may determine that the humidity value is outside of a predetermined range of humidity values to determine that an untrusted device has been connected to the hardware port 124. For instance, a connection of an untrusted device to a hardware port 124 may cause the internal humidity of the device 102 (e.g., the humidity of the air within the housing of the device 102) to change/deviate from a baseline (e.g., change to a humidity outside of a predetermined range of temperature values). In some implementations, the sensed humidity within the device 102 (e.g., near the hardware port 124) is used as a corroborating signal to corroborate an out-of-range electrical parameter measured by the port meter 126, and the operating system 118 may determine, with higher confidence, that an untrusted device is connected to the hardware port 124 if it detects both (i) an out-of-range electrical parameter value and (ii) an out-of-range humidity parameter value.

As yet another example, the vibration experienced by the computing device 102 when used in the home office of the user 108 may remain within threshold limits. Accordingly, the sensor(s) 136 may represent a vibration sensor, such as an accelerometer, that is configured to sense the vibrations of the computing device 102. The sensor 136 can sense vibrations and send a value(s) of the measured vibrations to the operating system 118 via the hardware bus of the computing device 102. The sensor 136 may be configured to sense the vibrations of the computing device 102 at any suitable time, such in response to any suitable instruction (e.g., from the operating system 118) or event (e.g., movement detected by the sensor 136, such as an accelerometer), and/or at any suitable frequency or schedule. In some implementations, the sensor 136 is configured to periodically sense the vibrations (or lack thereof) to generate a series of values (e.g., vibration values). If the operating system 118 determines that the sensed vibration value(s) falls outside of a predetermined range of values, the operating system 118 may determine that the computing device 102 has likely been used in an untrusted way, such as taken by vehicle to another location outside of the user's 108 home office. This too may be a risk signal that is treated as a supplementary signal to the detection of an untrusted device being connected to a hardware port 124, or it may be used independently as a signal that indicates the computing device 102 is likely being used in an untrusted way. In some examples, the sensor 136 is configured to measure a vibration parameter in units of standard gravity (g), in meters per second squared (m/s²), or any other suitable unit of measurement. In some implementations, the sensor 136 is configured to sense the vibrations within the computing device 102 (e.g., inside the housing of the computing device 102), and/or vibrations of, or near, a hardware port 124 to help detect a connection of an untrusted device to the hardware port 124. For instance, based on a connection of a device to a hardware port 124, the sensor 136 may sense a vibration within the device 102 (e.g., of, or near, the hardware port 124) to generate a vibration value, and the operating system 118 may determine that the vibration value is outside of a predetermined range of vibration values to determine that an untrusted device has been connected to the hardware port 124. In some implementations, the sensed vibration within the device 102 (e.g., of, or near, the hardware port 124) is used as a corroborating signal to corroborate an out-of-range electrical parameter measured by the port meter 126, and the operating system 118 may determine, with higher confidence, that an untrusted device is connected to the hardware port 124 if it detects both (i) an out-of-range electrical parameter value and (ii) an out-of-range vibration parameter value.

In an example scenario, the user 108 may transport his/her computing device 102 to a public location, such as a coffee shop, to handle customer queries from the public location. The public location may provide a public WiFi network to connect to the remote computing system 104. In this scenario, the sensor(s) 136 may sense one or more parameters (e.g., temperature, humidity, and/or vibration) to generate a value(s) of the sensed parameter(s), and the value(s) may be sent to the operating system 118. The operating system 118 may determine, based on the value(s) received from the sensor(s) 136, that the computing device 102 is being used in an untrusted way and/or location. For example, the operating system 118 may determine that the value(s) received from the sensor(s) 136 is not within a predetermined range of values associated with normal usage of the computing device 102 and/or a known location where the computing device 102 is expected to be used. In this manner, the operating system 118 may determine, without knowing exactly how or where the computing device 102 is being used, that it is likely not being used in a trusted way or at a trusted location, such as at the user's 108 home office, to handle customer queries on behalf of the service provider.

Similar actions aimed at protecting the customer data 110 can be performed (or taken) by the computing device 102 (e.g., by the operating system 118) in response to determining that the computing device 102 is being used in an untrusted way or location. For example, the computing device 102 may send, to the remote computing system 104, a notification indicative of an out-of-range parameter value(s) (e.g., temperature, humidity, and/or vibration). In some implementations, the action performed in response to determining that the computing device 102 is being used in an untrusted way or location may be to disable the computing device 102, and/or to disable a component(s) of the computing device 102, such as the communications interface(s) 116, thereby preventing incoming and/or outgoing traffic to and/or from the computing device 102.

Figure 2:
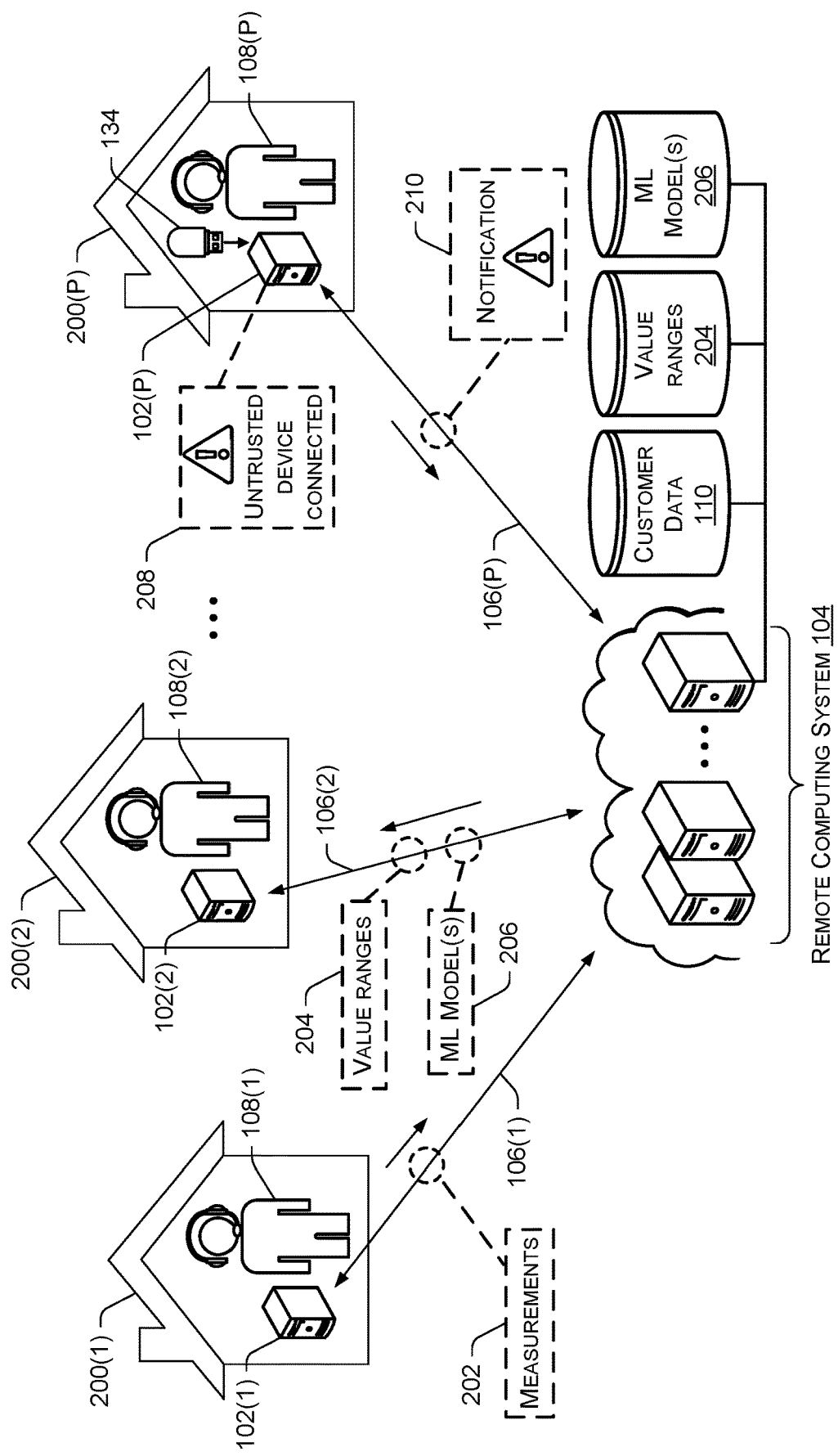
FIG. 2 illustrates the remote computing system of FIG. 1 in communication with multiple user computing devices, such as the computing device of FIG. 1.

FIG. 2 illustrates the remote computing system 104 of FIG. 1 in communication with multiple user computing devices 102(1) to 102(P) (P being any suitable integer). The individual computing devices 102 shown in FIG. 2 may be similar to the computing device 102 introduced in FIG. 1 in that they are configured to determine whether an untrusted device is connected to a hardware port 124 of the computing device 102, among other things described herein.

FIG. 2 illustrates a first computing device 102(1) being used by a first user 108(1) in a first home 200(1) of the first user 108(1). For example, the first user 108(1) may represent a first CSA that is tasked with handling customer queries from customers of a service provider that maintains and/or operates the remote computing system 104. Meanwhile, FIG. 2 illustrates a second computing device 102(2) being used by a second user 108(2) in a first home 200(2) of the second user 108(2), and a $P^{th}$ computing device 102(P) being used by a $P^{th}$ user 108(P) in a $P^{th}$ home 200(P) of the $P^{th}$ user 108(P), P being any suitable integer. Accordingly, the remote computing system 104 may be in communication with multiple computing devices 102(1) to 102(P), such as by establishing multiple authenticated computing sessions 106(1) to 106(P) with the respective computing devices 102(1) to 102(P).

In the example of FIG. 2, the first computing device 102(1) is shown as sending measurements 202 (e.g., data including measured values) to the remote computing system 104. Any of the computing devices 102(1)-(P) may send measurements 202 in this manner. These measurements 202 can include electrical parameter measurements and/or sensor measurements. For example, as described above, the port meter(s) 126 of the first computing device 102(1) is/are configured to measure one or more electrical parameters associated with the hardware port(s) 124 of the first computing device 102(1). The values of the measured electrical parameters (e.g., impedance value(s), voltage value(s), and/or current value(s), etc.) may be sent by the first computing device 102 to the remote computing system 104 as the measurements 202. As another example, and as described above, the sensor(s) 136 of the first computing device 102(1) is/are configured to measure one or more parameters such as temperature, humidity, and/or vibration associated with the computing device 102(1). The values of the sensed parameters (e.g., temperature value(s), humidity value(s), and/or vibration value(s), etc.) may be sent by the first computing device 102 to the remote computing system 104 as the measurements 202. The remote computing system 104 may collect, aggregate, store, and/or process the measurements 202 for various purposes described herein.

In an example, the measurements 202 can be used to determine value ranges 204, such as value ranges that are associated with trusted and/or untrusted external devices that users 108 may connect to their computing devices 102. In an illustrative example, the remote computing system 104 may collect multiple instances of impedance parameter values associated with company-issued headsets 128 that users 108 are connecting to their computing devices 102, and that the port meters 126 are measuring when the headsets 128 are connected. Additionally, or alternatively, such value ranges 204 (or baselines) can be determined in other offline processes, such as by running tests that involve connecting known external devices to a computing device 102 and using the port meter(s) 126 of the computing device 102 to measure the electrical parameter values associated with a hardware port 124 when those external devices are connected to the hardware port 124. In some implementations, statistics (e.g., average values) can be computed across a large data set based on collected measurements 202 from many different computing devices 102 to determine suitable value ranges 204 that are usable by operating systems 118 of the computing devices 102 to determine when untrusted devices are connected to a hardware port 124, and/or to determine when the computing devices 102 are being used in an untrusted way or location. In general, the measurements 202 can be collected from multiple computing devices 102 as users 108 use the devices 102 during normal, permissible operation or otherwise. Thus, the measurements 202 can be used to fingerprint, profile, and/or baseline the typical electrical parameters and/or sensed parameters exhibited over time. Outlier data can be flagged and filtered out of the data set to determine averages and other statistical parameters of the remaining (unfiltered) measurements 202. In some implementations, the measurements 202 may be collected over a threshold time period in order to aggregate a sufficient data set, such as collecting measurements 202 over a threshold period of days, weeks, or months.

As another example, the measurements 202 can be collected over time, and a sampled set of the measurements 202 can be selected (e.g., periodically) and used to train a machine learning model(s) 206. Machine learning generally involves processing a set of examples (called "training data") in order to train a machine learning model(s) 206. A machine learning model(s) 206, once trained, is a learned mechanism that can receive new data as input and estimate or predict a result as output. For example, a trained machine learning model 206 can comprise a classifier that is tasked with classifying unknown input (e.g., an unknown image) as one of multiple class labels (e.g., labeling the image as a cat or a dog). In some cases, a trained machine learning model 206 is configured to implement a multi-label classification task (e.g., labeling images as "cat," "dog," "duck," "penguin," and so on). Additionally, or alternatively, a trained machine learning model 206 can be trained to infer a probability, or a set of probabilities, for a classification task based on unknown data received as input. In the context of the present disclosure, the unknown input may include values of an electrical parameter(s) (e.g., impedance value(s), voltage value(s), and/or current value(s), etc.) associated with a hardware port 124 and measured by a port meter 126 of the computing device 102, and the trained machine learning model(s) 206 may be tasked with outputting a probability of an untrusted device being connected to a hardware port 124 of the computing device 102. In some embodiments, the probability is a variable that is normalized in the range of [0,1]. In some implementations, the trained machine learning model(s) 206 may output a set of probabilities (e.g., two probabilities), where one probability relates to the probability of an untrusted device being connected to a hardware port 124 of the computing device 102, and the other probability relates to the probability of a trusted device being connected to a hardware port 124 of the computing device 102. The probability that is output by the trained machine learning model(s) 206 can relate to either of these probabilities (trusted device or untrusted device) to indicate a level of trustworthiness of an external device connected to a hardware port 124 of the computing device 102. In some implementations, the unknown input to the machine learning model(s) 206 may include values of a sensed parameter (e.g., temperature value(s), humidity value(s), and/or vibration value(s), etc.) sensed by the sensor(s) 136 of the computing device 102, and the trained machine learning model(s) 206 may be tasked with outputting a probability of the computing device 102 having been used in an untrusted way and/or location. In some implementations, the unknown input to the machine learning model(s) 206 may include both: (i) values of an electrical parameter(s) associated with a hardware port 124 and measured by a port meter 126 of the computing device 102 and (ii) values of a sensed parameter sensed by the sensor(s) 136 of the computing device 102.

The trained machine learning model(s) 206 may represent a single model or an ensemble of base-level machine learning models, and may be implemented as any type of machine learning model 206. For example, suitable machine learning models 206 for use with the techniques and systems described herein include, without limitation, neural networks, tree-based models, support vector machines (SVMs), kernel methods, random forests, splines (e.g., multivariate adaptive regression splines), hidden Markov model (HMMs), Kalman filters (or enhanced Kalman filters), Bayesian networks (or Bayesian belief networks), expectation maximization, genetic algorithms, linear regression algorithms, nonlinear regression algorithms, logistic regression-based classification models, or an ensemble thereof. An "ensemble" can comprise a collection of machine learning models 206 whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

The training data that is used to train the machine learning model 206 may include various types of data. In general, training data for machine learning can include two components: features and labels. However, the training data used to train the machine learning model(s) 206 may be unlabeled, in some embodiments. Accordingly, the machine learning model(s) 206 may be trainable using any suitable learning technique, such as supervised learning, unsupervised learning, semi-supervised learning, reinforcement learning, and so on. The features included in the training data can be represented by a set of features, such as in the form of an n-dimensional feature vector of quantifiable information about an attribute of the training data. As part of the training process, weights may be set for machine learning. These weights may apply to a set of features included in the training data. In some embodiments, the weights that are set during the training process may apply to parameters that are internal to the machine learning model(s) (e.g., weights for neurons in a hidden-layer of a neural network). These internal parameters of the machine learning model(s) 206 may or may not map one-to-one with individual input features of the set of features. The weights can indicate the influence that any given feature or parameter has on the probability that is output by the trained machine learning model 206.

FIG. 2 depicts the remote computing system 104 sending data to the second computing device 102(2), such as data including value ranges 204 (e.g., value ranges 204 of an electrical parameter(s), such as impedance, voltage, and/or current, value ranges 204 of other parameters, such as temperature, humidity, and/or vibration, etc.), and/or data including the trained machine learning model(s) 206. Such data may be sent to any of the computing devices 102(1)-(P) in this manner. In the example of FIG. 2, the second computing device 102(2) may store the data it receives from the remote computing system 104 in local memory 114, and the operating system 118 may use this data in conjunction with the measured/sensed values it receives from the port meter(s) 126 and/or from the sensor(s) 136 to make a determination as to whether an untrusted device is connected to a hardware port 124 and/or whether the computing device 102 is being used in an untrusted way and/or location. For example, the operating system 118 of the second computing device 102(2) may compare a value(s) of an electrical parameter(s) received from a port meter 126 to a predetermined range(s) of values 204 associated with a trusted device or an untrusted device to determine whether the received value(s) is/are indicative of a connection of a trusted device or an untrusted device to a hardware port 124. Additionally, or alternatively, the operating system 118 may input a value(s) of an electrical parameter(s) received from a port meter 126 to the trained machine learning model(s) 206 to determine, based on the output of the machine learning model(s) 206, whether the received value(s) is/are indicative of a connection of a trusted device or an untrusted device to a hardware port 124. Accordingly, any computing device 102 may store data, such as value ranges 204 and/or a trained machine learning model(s) 206, for local processing of parameter values to make determinations without reliance on the remote computing system 104 for making those determinations. In other implementations, some or all of the processing of parameter values may occur remotely relative to a user computing device 102. For example, a computing device 102 may send (e.g., stream) a measured/sensed value(s) in real-time to the remote computing system 104 for remote processing of the measured/sensed value(s), and the remote computing system 104 may make a determination using a value range(s) 204 and/or a trained machine learning model(s) 206, and send a response (e.g., an instruction) back to the computing device 102 based on the determination. In this manner, the computing device 102 may receive a response from the remote computing system 104 in response to sending a value(s) of a measured/sensed parameter(s) to the remote computing system 104, and the response from the remote computing system 104 may inform the computing device 102 as to whether a connected external device is untrusted or trusted, and may, in some cases, cause the computing device 102 to perform an action, as described herein.

FIG. 2 also illustrates an example scenario where a user 108(P) connects an external device 134 to a hardware port 124 of a computing device 102(P). The external device 134, in the example of FIG. 2, represents a keyboard emulator (e.g., a USB Rubber Ducky). In this example scenario, the computing device 102(P) determines that an external device is connected to a hardware port 124, and determines, using the port meter 126 corresponding to the hardware port 124, a value(s) of the electrical parameter(s) (e.g., an impedance parameter, a voltage parameter, and/or a current parameter, etc.) associated with the hardware port 124. The computing device 102(P) (e.g., the operating system 118) then determines, based at least in part on the value(s) of the electrical parameter(s), that an untrusted device 134 is connected to the hardware port 124, and performs an action based at least in part on the determining that the untrusted device 134 is connected to the hardware port 124. The determination 208 of the untrusted device 134 being connected to the hardware port 124 may involve comparing the value(s) of the electrical parameter(s) to a predetermined range(s) of values 204, as described herein, or inputting the value(s) of the electrical parameter(s) to a trained machine learning model(s) 206, as described herein. In some examples, the computing device 102(P) may determine the type of device that is connected to the hardware port 124 (e.g., a USB Rubber Ducky). In other examples, the computing device 102(P) may deduce that an untrusted device is connected to the hardware port 124(P) without knowing what type of untrusted device is connected. In the example of FIG. 2, the action performed by the computing device 102(P) is an action of sending, to the remote computing system 104, a notification 210 indicative of a connection of the untrusted device to the hardware port 124. Other actions may be performed in lieu of, or in addition to, sending the notification 210, such as disabling the computing device 102(P) and/or disabling a communications interface(s) 116 of the computing device 102(P).

Figure 3:
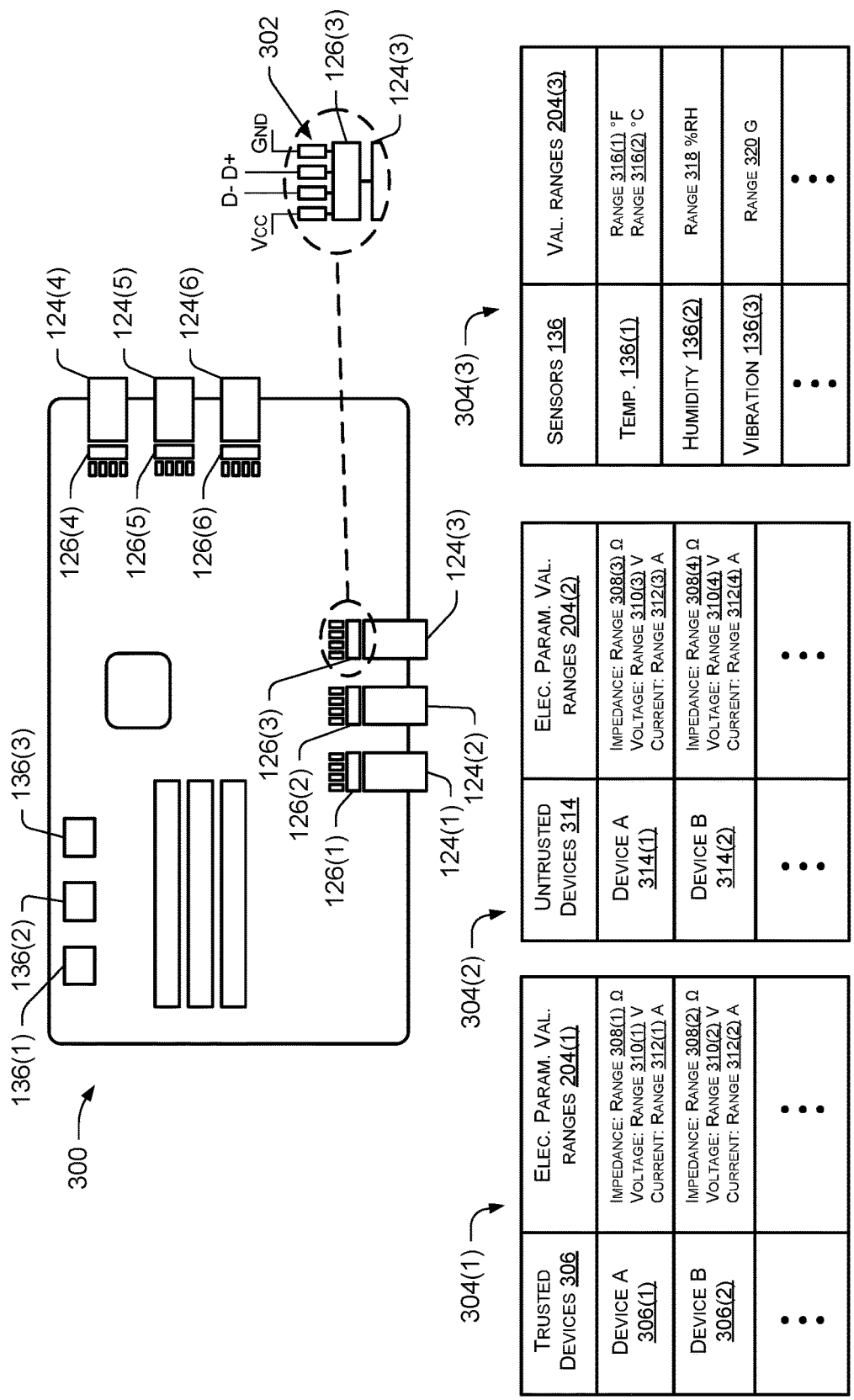
FIG. 3 illustrates an example printed circuit board (PCB) of the computing device of FIG. 1, the PCB having mounted thereon a plurality of port meters to measure an electrical parameter(s) associated with respective hardware ports of the computing device.

FIG. 3 illustrates an example printed circuit board (PCB) 300 of the computing device 102 of FIG. 1, the PCB 300 having mounted thereon a plurality of port meters 126(1)-(6) to measure an electrical parameter(s) associated with respective hardware ports 124(1)-(6) of the computing device 102. The PCB 300 may be disposed internal to the computing device 102 (e.g., within, and enclosed by, a housing of the device 102), and the PCB 300 may represent a motherboard, a baseboard, or any other suitable computer board. The PCB 300 may have various electronic components of the computing device 102 mounted thereon, such as the processor(s) 112, the memory 114, and the communications interface(s) 116 introduced in FIG. 1. The hardware ports 124 are mounted at a periphery of the PCB 300 so that, when the PCB 300 is disposed within the housing of the computing device 102, the hardware ports 124 are exposed through, and made accessible to the user 108 via, orifices defined in the housing of the computing device 102. In this way, a user 108 may connect external devices to the hardware ports 124. In some implementations, the hardware ports 124 represent USB ports, HDMI ports, other types of ports, or some combination thereof. The example of FIG. 3 shows a PCB 300 with a total of six hardware ports 124(1) to 124(6), but six is merely an example number of hardware ports 124.

The port meters 126(1) to 126(6) each correspond to one of the hardware ports 124(1) to 124(6). For example, the port meter 126(1) corresponds to (or is associated with) the hardware port 124(1), the port meter 126(2) corresponds to (or is associated with) the hardware port 124(2), and so on and so forth. The port meters 126 are internal to the computing device 102 by virtue of being mounted on the PCB 300. An individual port meter 126 may be mounted on the PCB 300 adjacent a corresponding hardware port 124. "Adjacent" in this context can mean "within a threshold distance from" the hardware port 124. This threshold distance may be about an inch, which facilitates electrical wiring/connections between the port meter 126 and the corresponding hardware port 124. An individual port meter 126 may be in the form of a computer chip, an integrated circuit (IC), or any similar electronic component. In some implementations, an individual port meter 126 is mounted on (e.g., embedded in) the PCB 300 between the PCB pins 302 on the PCB 300 and the hardware port 124. An example of this configuration is shown in FIG. 3 with respect to the zoomed-in view of the portion of the hardware port 124(3), the port meter 126(3), and the PCB pins 302 corresponding to the hardware port 124(3). That is, the port meter 126(3) is mounted on the PCB 300 between the PCB pins 302 associated with the hardware port 124(3) and the connector portion of the hardware port 124(3) itself. In some implementations, the PCB pins 302 represent USB pins, such as Vcc, Data− (D−), Data+ (D+), and Ground (Gnd), which correspond to red, white, green, and black USB pins. Furthermore, the hardware ports 124, in some implementations, represent female ports (e.g., female USB ports) that are configured to receive a male connector (e.g., a male USB connector) of an external device. The port meter 126(3) is electrically connected to the hardware port 124(3) and to the PCB pins 302 in order to measure the electrical parameter(s) associated with the hardware port 124(3). For example, a voltage parameter can be measured as the voltage across the Vcc (Red) and Gnd (Black) pins 302 to generate a value(s)

of the voltage parameter. Similar measurements can be taken to determine other electrical parameters, such as impedance, current, etc.

The PCB 300 is also shown as having mounted thereon a plurality of sensors 136(1) to 136(3). The sensors 136 may represent a temperature sensor 136(1), a humidity sensor 136(2), and a vibration sensor 136(3), as described herein. These sensors 136 are configured to sense parameters such as temperature, humidity, and vibration to generate values of the sensed parameters, which may be received and processed by the operating system 118 to make a determination as to whether the computing device 102 is being used in an untrusted way and/or location, as described herein.

FIG. 3 also illustrates example tables 304 that specify predetermined value ranges 204 that are usable to implement the techniques described herein. For example, a first table 304(1) may specify predetermined value ranges 204(1) associated with trusted devices 306. Accordingly, the first table 304(1) includes a list of trusted devices 306, such as trusted Device A 306(1), trusted Device B 306(2), and so on and so forth for any number of trusted devices 306. An example of a trusted device 306 might be company-issued headphones 128 that are used by a user 108 of the computing device 102 (e.g., by connecting the headphones 128 to the computing device 102) to handle customer calls for a call center. For example, a service provider may issue its employees/contractors a few different types of headphones 128 or headsets to use when handling customer calls. Other trusted devices might be a company-issued keyboard, mouse, etc. For each trusted device 306, the first table 304(1) may specify one or more predetermined value ranges 204(1) of an electrical parameter(s). For example, the electrical parameter value ranges 204(1) may include a predetermined range of values 308 of an impedance parameter, a predetermined range of values 310 of a voltage parameter, and/or a predetermined range of values 312 of a current parameter. Accordingly, the first table 304(1) indicates that the trusted Device A 306(1) is associated with a predetermined range of values 308(1) of an impedance parameter (e.g., specified in ohms), a predetermined range of values 310(1) of a voltage parameter (e.g., specified in volts), and a predetermined range of values 312(1) of a current parameter (e.g., specified in amperes). These value ranges 308(1), 310(1), and 312(1) inform the operating system 118 of a computing device 102 as to what values of the electrical parameter(s) to expect when the trusted Device A is connected to a hardware port 124 of the computing device 102, and if the port meter 126 measures a value(s) within the predetermined value range(s) 308(1), 310(1), and/or 312(1), the operating system 118 can determine that the connected external device is likely the trusted Device A 306(1). Similar value ranges 308, 310, and 312 may be specified in the first table 304(1) for any number of other trusted devices 306.

Meanwhile, the second table 304(2) includes a list of untrusted devices 314, such as untrusted Device A 314(1), untrusted Device B 314(2), and so on and so forth for any number of untrusted devices 314. An example of an untrusted device 314 might be an illicit audio recording device known to have been connected to hardware ports 124 of computing devices 102 in the field, or keyboard emulators, such as a USB Rubber Ducky, a mouse jiggler, and the like. For each untrusted device 314, the second table 304(2) may specify one or more predetermined value ranges 204(2) of an electrical parameter(s). For example, the electrical parameter value ranges 204(2) may include a predetermined range of values 308 of an impedance parameter, a predetermined range of values 310 of a voltage parameter, and/or a predetermined range of values 312 of a current parameter. Accordingly, the second table 304(2) indicates that the untrusted Device A 314(1) is associated with a predetermined range of values 308(3) of an impedance parameter (e.g., specified in ohms), a predetermined range of values 310(3) of a voltage parameter (e.g., specified in volts), and a predetermined range of values 312(3) of a current parameter (e.g., specified in amperes). These value ranges 308(3), 310(3), and 312(3) inform the operating system 118 of a computing device 102 as to what values of the electrical parameter(s) to expect when the known untrusted Device A is connected to a hardware port 124 of the computing device 102, and if the port meter 126 measures a value(s) within the predetermined value range(s) 308(3), 310(3), and/or 312(3), the operating system 118 can determine that the connected external device is likely the known untrusted Device A 314(1). Similar value ranges 308, 310, and 312 may be specified in the second table 304(2) for any number of other untrusted devices 314.

The third table 304(3) includes a list of sensors 136, such as the temperature sensor 136(1), the humidity sensor 136(2), the vibration sensor 136(3), and so on and so forth for any number of sensors 136 of the computing device 102. For each sensor 136, the third table 304(3) may specify one or more predetermined value ranges 204(3) of a parameter. Accordingly, the third table 304(3) indicates that the temperature sensor 136(1) is associated with predetermined ranges of values 316(1) of a temperature parameter (e.g., specified in ° F.) and a predetermined range of values 316(2) of the temperature parameter (e.g., specified in ° C.). These value ranges 316(1) and 316(2) inform the operating system 118 of a computing device 102 as to what values of the temperature parameter to expect when the computing device 102 is used in a trusted location or environment, and if the temperature sensor 136(1) senses a value(s) within the predetermined value range(s) 316(1) and/or 316(2), the operating system 118 can determine that the computing device 102 is likely being used in a trusted location. Similarly, the third table 304(3) indicates that the humidity sensor 136(2) is associated with a predetermined range of values 318 of a humidity parameter (e.g., specified in % RH). This value range 318 informs the operating system 118 of a computing device 102 as to what values of the humidity parameter to expect when the computing device 102 is used in a trusted location or environment, and if the humidity sensor 136(2) senses a value(s) within the predetermined value range 318, the operating system 118 can determine that the computing device 102 is likely being used in a trusted location. Similarly, the third table 304(3) indicates that the vibration sensor 136(3) is associated with a predetermined range of values 320 of a vibration parameter (e.g., specified in standard gravity). This value range 320 informs the operating system 118 of a computing device 102 as to what values of the vibration parameter to expect when the computing device 102 is used in a trusted way, and if the vibration sensor 136(3) senses a value(s) within the predetermined value range 320, the operating system 118 can determine that the computing device 102 is likely being used in a trusted way.

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
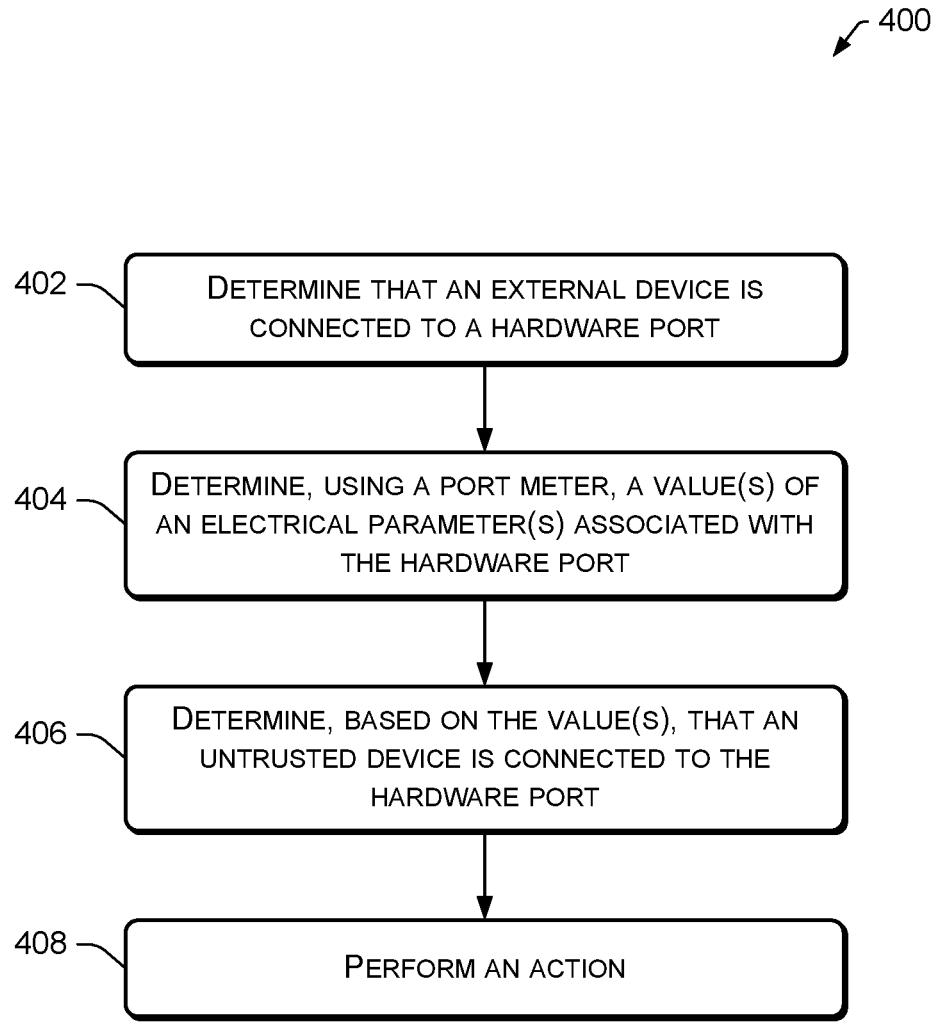
FIG. 4 is a flow diagram showing aspects of an example process for determining that an untrusted device is connected to a hardware port of a computing device, and performing an action based on the determined connection of the untrusted device.

FIG. 4 is a flow diagram showing aspects of an example process 400 for determining that an untrusted device is connected to a hardware port 124 of a computing device 102, and performing an action based on the determined connection of the untrusted device. The process 400 is described, by way of example, with reference to the previous figures.

At 402, a processor(s) 112 of a computing device 102 may determine that an external device is connected to a hardware port 124 of the computing device 102. The external device, as its name implies, is external to the computing device 102, and the hardware port is configured to receive a connector of the external device. In some implementations, the hardware port is a USB port (e.g., Type A, Type B, Type C, Standard, Mini, Micro, etc.). In other implementations, the hardware port is a HDMI port, or another type of female hardware port.

At 404, the processor(s) 112 may determine, using a port meter 126 that is internal to the computing device 102 and electrically connected to the hardware port 124, a value(s) of an electrical parameter(s) associated with the hardware port 124. The port meter 126 may be configured to measure any suitable type of electrical parameter(s), such as, without limitation, an impedance parameter, a voltage parameter, and/or a current parameter. In some implementations, the port meter 126 is a computer chip (e.g., IC) mounted adjacent the hardware port 124 on a PCB 300 (e.g., the motherboard) disposed within a housing of the computing device 102.

At 406, an operating system 118 of the computing device 102, when executed by the processor(s) 112, may determine, based at least in part on the value(s) of the electrical parameter(s), that an untrusted device is connected to the hardware port 124. For example, an illicit recording device, a keyboard emulator, a mouse jiggler, or a key logger may have been connected to the hardware port 124, either directly or indirectly (e.g., via an additional connector 132 of a headphone splitter), which caused a change in the electrical parameter(s) to produce the value(s) measured by the port meter 126, and, hence, the value(s) is indicative of the untrusted device having been connected to the hardware port 124. In some implementations, determining that an untrusted device is connected to the hardware port 124 at block 406 may involve the computing device 102 sending the value(s) of the electrical parameter(s) to a remote computing system 104, and the computing device 102 receiving a response from the remote computing system 104, the response informing the computing device 102 that an untrusted device is connected to the hardware port 124. In such an implementation, the remote computing system 104 may determine that the value(s) is/are outside of a predetermined range(s) of values associated with a trusted device and/or that the value(s) is/are within a predetermined range(s) of values associated with an untrusted device. In some examples, the remote computing system 104 may provide the value(s) as input to a trained machine learning model(s), and may generate, as output from the trained machine learning model(s), a probability that the untrusted device is connected to the hardware port 104.

At 408, the processor(s) 112 may perform an action based at least in part on the determining that the untrusted device is connected to the hardware port 124. The action performed at block 408 may include, without limitation, sending, to a remote computing system 104, a notification indicative of a connection of the untrusted device to the hardware port 124, disabling the computing device 102, and/or disabling a component(s) (e.g., a communication interface(s) 116) of the computing device 102. In this manner, the process 400 may help detect and prevent unauthorized access to customer data 110 (e.g., sensitive data and/or resources of customers of a service provider) via the remote computing system 104.

Figure 5:
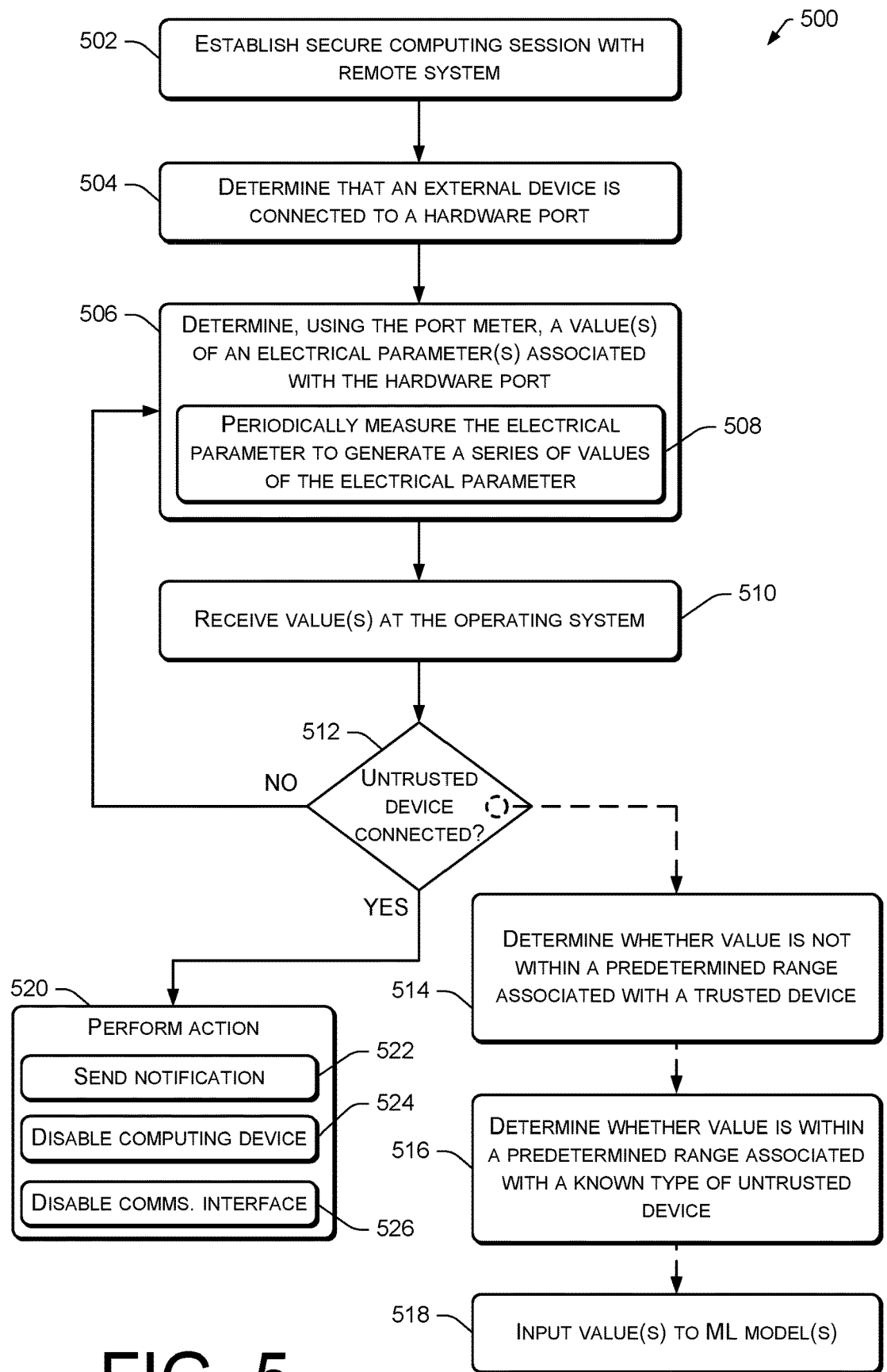
FIG. 5 is a flow diagram showing aspects of another example process for determining whether an untrusted device is connected to a hardware port of a computing device, and performing an action based on a determined connection of the untrusted device.

FIG. 5 is a flow diagram showing aspects of another example process 500 for determining whether an untrusted device is connected to a hardware port 124 of a computing device 102, and performing an action based on a determined connection of the untrusted device. The process 500 is described, by way of example, with reference to the previous figures.

At 502, a computing device 102 may establish, via a communications interface(s) 116 of the computing device 102, an authenticated computing session 106 with a remote computing system 104. The remote computing system 104 may maintain customer data 110 of a service provider. The authenticated computing session 106 may be established over any suitable network, such as a WAN (e.g., the Internet), a cellular network, an intranet or an ISP network or a combination of such networks. In some implementations, the authenticated computing session 106 may represent an encrypted, authenticated session. In some implementations, a VPN is utilized to establish the authenticated computing session 106 between the computing device 102 and the remote computing system 104, but any suitable type of network access technology can be utilized to establish the session 106.

At 504, a processor(s) 112 of the computing device 102 may determine that an external device is connected to a hardware port 124 of the computing device 102. The operation(s) performed at block 504 may be similar to the operation(s) performed at block 402 of the process 400.

At 506, the processor(s) 112 may determine, using a port meter 126 that is internal to the computing device 102 and electrically connected to the hardware port 124, a value(s) of an electrical parameter(s) associated with the hardware port 124. The operation(s) performed at block 506 may be similar to the operation(s) performed at block 404 of the process 400. The determining the value(s) of the electrical parameter(s) at block 506 may occur during the authenticated computing session 106 established at block 502.

At sub-block 508, the port meter 126 may be used to periodically measure the electrical parameter(s) to generate a series of values of an individual electrical parameter. For example, a periodic measurement interval (e.g., an interval of 100 ms) may be used to measure, using the port meter 126, an impedance parameter associated with the hardware port 124 to generate a series of first values of the impedance parameter that are spaced at 100 ms intervals. Additionally, or alternatively, the port meter 126 may be used to measure a voltage parameter associated with the hardware port 124 to generate a series of second values of the voltage parameter that are spaced at 100 ms intervals. Additionally, or alternatively, the port meter 126 may be used to measure a current parameter associated with the hardware port 124 to generate a series of third values of the current parameter that are spaced at 100 ms intervals. If the computing device 102 includes multiple hardware ports 124, the operation(s) performed at block 506 and sub-block 508 may be repeated using additional port meters 126 associated with those hardware ports 126, each port meter 126 being used to generate a series of values of an electrical parameter(s). The periodic measuring of the electrical parameter(s) at sub-block 508 may occur during the authenticated computing session 106 established at block 502.

At 510, an operating system 118 of the computing device 102 may receive the value(s) of the electrical parameter determined at block 506. For example, the operating system 118 may receive a series of values of an electrical parameter(s) generated at sub-block 508, such as a series of first values of an impedance parameter and/or a series of second values of a voltage parameter and/or a series of third values of a current parameter. The operating system 118 may receive values from multiple port meters 126 at block 510. In some implementations, the values are received (e.g., streamed) in real-time from the port meters 126, sent in batches, or received in any other suitable manner. In some implementations, the operating system 118 receives the value(s) via a hardware bus connected to the port meter(s) 126.

At 512, a determination may be made (e.g., by the operating system 118, and based on the value(s) of the electrical parameter(s) received at block 510) as to whether an untrusted device is connected to a hardware port(s) 124 of the computing device 102. The operation(s) performed at block 512 may be similar to the operation(s) performed at block 406 of the process 400. Blocks 514-518 illustrate examples of how the determination can be made at block 512.

At 514, the operating system 118 (or the remote computing system 104) may determine that a value of the electrical parameter(s) received at block 510 (e.g., a value of a series of values received at block 510) is not within (or is outside) a predetermined range of values 204(1) associated with a trusted device 306 (e.g., a trusted USB device). For example, the operating system 118 (or the remote computing system 104) may receive a value of an impedance parameter associated with a hardware port 124, and by comparing the value to a predetermined range 308(1) of impedance values, the operating system 118 (or the remote computing system 104) may determine that the received value is not within (or is outside) the predetermined range 308(1) of impedance values. This may be done for values of other types of electrical parameters, such as a voltage parameter and/or a current parameter, associated with the hardware port 124.

In some implementations, the operating system 118 (or the remote computing system 104) looks for corroborating signals to make the determination at block 512 (and/or block 514). For example, the operating system 118 (or the remote computing system 104) may determine that an untrusted device is connected to a hardware port 124 if a first value of an impedance parameter is outside a predetermined range of impedance values and a second value of a voltage parameter is outside a predetermined range of voltage values and a third value of a current parameter is outside a predetermined range of current values. In other words, if all three electrical parameters (e.g., impedance, voltage, and current) are measuring outside of predetermined value ranges 204(1) associate with trusted devices 306, the determination may be made in the affirmative at block 512 (i.e., that an untrusted device is connected to the hardware port 124). In this scenario, if any of the three electrical parameters measure within a predetermined value range 204(1) of a trusted device 306, the operating system 118 (or the remote computing system 104) may not have enough confidence to make the determination in the affirmative at block 512. In other implementations, other corroboration or confidence thresholds can be utilized, such as determining that an untrusted device is connected to a hardware port 124 if at least two out of three electrical parameters measure outside of predetermined value ranges 204(1) associated with trusted devices 306.

In some implementations, the operating system 118 (or the remote computing system 104) may determine, as a corroborating signal, whether an electrical parameter(s) measures outside of a predetermined value range 204(1) associated with a trusted device 306 for longer than a threshold period of time and/or more than a threshold number of consecutive measurements. For example, if a port meter 126 streams a series of values of an impedance parameter to the operating system 118 (which may be forwarded to the remote computing system 104), the operating system 118 (or the remote computing system 104) may wait to receive a threshold number of consecutive values of the impedance parameter that are outside of a predetermined range 308 of values before determining that an untrusted device is connected to a hardware port 124. This may allow for ignoring transient spikes of anomalous electrical parameter measurements (e.g., due to interference or the like). In some embodiments, the operating system 118 (or the remote computing system 104) may look for other signals (e.g., out-of-range temperature, humidity, and/or vibration values sensed by the sensor(s) 136) to corroborate a detection of an out-of-range value of an electrical parameter received from a port meter 126.

It is also to be appreciated that a predetermined "range" of values, as used herein, may include a range that includes a single value, in some implementations. In other words, the determination at block 514 might involve determining whether a value received at block 510 deviates from a single, baseline value associated with a trusted device. In another example, the determination at block 514 might involve determining whether a value received at block 510 deviates from a value that was previously measured by a port meter 126. That is, if the port meter 126 associated with a hardware port 124 measured, at time, t1, a first value of an impedance parameter, for example, and then the port meter 126 subsequently measured, at time, t2, a second value of the impedance parameter that is different than the first value (e.g., different by more than a threshold difference/amount), the operating system 118 (or the remote computing system 104) may determine that an untrusted device is connected to the hardware port 124.

At 516, the operating system 118 (or the remote computing system 104) may determine that a value of the electrical parameter(s) received at block 510 (e.g., a value of a series of values received at block 510) is within (or is inside) a predetermined range of values 204(2) associated with a known type of untrusted device 314 (e.g., a known type of untrusted USB device). For example, if a type of untrusted device, such as a keyboard emulator (e.g., a USB Rubber Ducky), is known and is associated with a predetermined range(s) of values 204(2) of an electrical parameter, the operating system 118 (or the remote computing system 104) may receive a value of, say, an impedance parameter associated with a hardware port 124, and by comparing the value to a predetermined range 308(3) of impedance values, the operating system 118 (or the remote computing system 104) may determine that the received value is within (or is inside) the predetermined range 308(3) of impedance values associated with the known type of untrusted device 314. This may be done for values of other types of electrical parameters, such as a voltage parameter and/or a current parameter, associated with the hardware port 124.

Again, the operating system 118 (or the remote computing system 104) may look for corroborating signals to make the determination at block 512 (and/or block 516). For example, the operating system 118 (or the remote computing system 104) may determine that an untrusted device is connected to a hardware port 124 if a first value of an impedance parameter is within a predetermined range of impedance values and a second value of a voltage parameter is within a predetermined range of voltage values and a third value of a current parameter is within a predetermined range of current values. In other words, if all three electrical parameters (e.g., impedance, voltage, and current) are measuring within predetermined value ranges 204(2) associate with a known type of untrusted devices 314, the determination may be made in the affirmative at block 512 (i.e., that an untrusted device is connected to the hardware port 124). In this scenario, if any of the three electrical parameters measure outside a predetermined value range 204(2) of an untrusted device 314, the operating system 118 (or the remote computing system 104) may not have enough confidence to make the determination in the affirmative at block 512. In other implementations, other corroboration or confidence thresholds can be utilized, such as determining that an untrusted device is connected to a hardware port 124 if at least two out of three electrical parameters measure within predetermined value ranges 204(1) associated with an untrusted device 314.

In some implementations, the operating system 118 (or the remote computing system 104) may determine, as a corroborating signal, whether an electrical parameter(s) measures within a predetermined value range 204(1) associated with an untrusted device 314 for longer than a threshold period of time and/or more than a threshold number of consecutive measurements. For example, if a port meter 126 streams a series of values of an impedance parameter to the operating system 118 (which may be forwarded to the remote computing system 104), the operating system 118 (or the remote computing system 104) may wait to receive a threshold number of consecutive values of the impedance parameter that are within a predetermined range 308 of values associated with an untrusted device 314 before determining that an untrusted device is connected to a hardware port 124. This may allow for ignoring transient spikes of anomalous electrical parameter measurements (e.g., due to interference or the like). In some embodiments, the operating system 118 (or the remote computing system 104) may look for other signals (e.g., out-of-range temperature, humidity, and/or vibration values sensed by the sensor(s) 136) to corroborate a detection of an in-range value of an electrical parameter received from a port meter 126.

In some implementations, the determination at block 516 might involve determining whether a value received at block 510 matches a single, baseline value associated with an untrusted device. "Matching," in this context, can mean within a threshold deviation from a single, baseline value. In general, the determination at block 512 (and/or blocks 514 and/or 516) may include determining a type of device that is connected to a hardware port 124, if a baseline is known for a particular type of device and if the value(s) matches, or is within a value range, associated with the known type of device.

At 518, the operating system 118 (or the remote computing system 104) may provide the value(s) received at block 510 as input to a trained machine learning model(s) 206, the trained machine learning model(s) 206 may generate, as output therefrom, a probability that an untrusted device is connected to a hardware port(s) 124 of the computing device 102, and the operating system 118 (or the remote computing system 104) may determine whether the probability meets or exceeds a threshold probability to determine whether an untrusted device is connected to a hardware port(s) 124 of the computing device 102. The trained machine learning model(s) 206 may be stored locally on the computing device 102 if the computing device 102 is not resource constrained. In some embodiments, the trained machine learning model(s) 206 is stored remotely at the remote computing system 104, and the computing device 102 sends data indicative of the value(s) received at block 510 to the remote computing system 104, and remote computing system 104 inputs the value(s) to the trained machine learning model(s) 206 to generate an output probability, and the remote computing system 104 sends data back to the computing device 102, in real-time, the data indicating whether an untrusted device is connected to a hardware port(s) 124 of the computing device 102. In this regard, it is to be appreciated that any of the logic described in blocks 514 and/or 516 may be performed remotely from the computing device 102, such as by the remote computing system 104, in some implementations.

If, at 512, a determination is made (e.g., by the operating system 118 and/or the remote computing system 104, and based on the value(s) of the electrical parameter(s) received at block 510) that an untrusted device is not connected to a hardware port(s) 124 of the computing device 102, the process 500 may follow the NO route from block 512 to block 506, where additional value(s) may be determined using the port meter(s) 126. If, on the other hand, a determination is made that an untrusted device (or a device that isn't what it claims to be) is connected to a hardware port(s) 124 of the computing device 102, the process 500 may follow the YES route from block 512 to block 520.

At 520, the processor(s) 112 may perform an action based at least in part on the determining that the untrusted device is connected to the hardware port 124. The operation(s) performed at block 520 may be similar to the operation(s) performed at block 408 of the process 400. Sub-blocks 522-526 illustrate example actions that may be performed at block 520.

At sub-block 522, the action performed at block 520 may include sending, to a remote computing system 104, a notification indicative of a connection of the untrusted device to the hardware port 124. The notification can be sent in any suitable manner using any suitable type of messaging technology (e.g., email, text, output on a display, etc.)

At sub-block 524, the action performed at block 520 may include disabling the computing device 102. For example, the operating system 118 may reboot the computing device 102 into a mode of operation where it cannot be used by the user 108 for handling customer queries. As another example, the operating system 118 may shut down (e.g., power off) the device 102 and may not allow the user 108 to establish an authenticated computing session 106 on a subsequent boot attempt.

At sub-block 526, the action performed at block 520 may include disabling a component(s) (e.g., a communication interface(s) 116) of the computing device 102, thereby preventing incoming and/or outgoing traffic to and/or from the computing device 102. In this/these manners, the process 500 may help detect and prevent unauthorized access to customer data 110 (e.g., sensitive data and/or resources of customers of a service provider) via the remote computing system 104.

Figure 6:
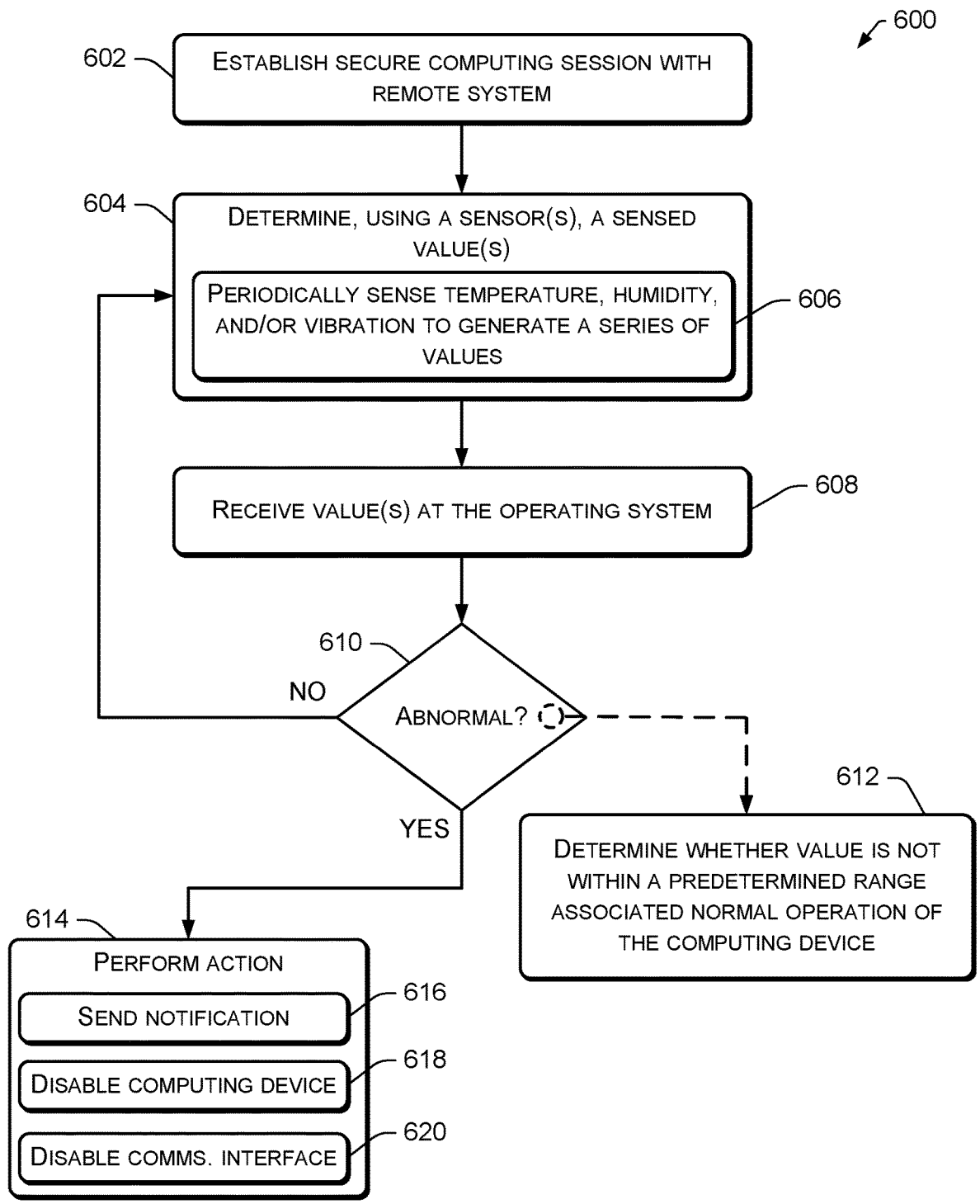
FIG. 6 is a flow diagram showing aspects of an example process for sensing abnormal parameter value(s), such as temperature, humidity, and/or vibration, and performing an action based on the abnormal sensed parameter value(s).

FIG. 6 is a flow diagram showing aspects of an example process 600 for sensing abnormal parameter value(s), such as temperature, humidity, and/or vibration, and performing an action based on the abnormal parameter value(s). The process 600 is described, by way of example, with reference to the previous figures.

At 602, a computing device 102 may establish, via a communications interface(s) 116 of the computing device 102, an authenticated computing session 106 with a remote computing system 104. The operation(s) performed at block 602 may be similar to the operation(s) performed at block 502 of the process 500.

At 604, a processor(s) 112 of the computing device 102 may determine, using a sensor(s) 136 of the computing device 102, a value(s) of a sensed parameter(s) associated with the computing device 102. The sensor(s) 136 may include, without limitation, a temperature sensor 136(1), a humidity sensor 136(2), and/or a vibration sensor 136(3). Accordingly, the sensed parameter(s) may include, without limitation, a temperature parameter, a humidity parameter, and/or a vibration parameter associated with the computing device 102. As such, the value(s) determined at block 604 may be indicative of a temperature, a humidity, and/or a vibration associated with the computing device 102.

At sub-block 606, the sensor(s) 136 may be used to periodically sense the parameter(s) to generate a series of values of an individual sensed parameter. For example, a periodic measurement interval (e.g., an interval of 100 ms) may be used to measure, using the temperature sensor 136(1), a temperature of an environment of the computing device 102 to generate a series of values of the temperature parameter that are spaced at 100 ms intervals. Additionally, or alternatively, other sensors 136, such as the humidity sensor 136(2) and/or the vibration sensor 136(3) may be used to measure respective sensed parameters to generate a respective series of values of those respective sensed parameter that are spaced at 100 ms intervals. The periodic measuring of the sensed parameter(s) at sub-block 606 may occur during the authenticated computing session 106 established at block 602.

At 608, an operating system 118 of the computing device 102 may receive the value(s) of the sensed parameter(s) determined at block 604. For example, the operating system 118 may receive a series of values of a sensed parameter(s) generated at sub-block 606, such as a series of first values of a temperature parameter and/or a series of second values of a humidity parameter and/or a series of third values of a vibration parameter. The operating system 118 may receive values from multiple sensors 136 at block 608. In some implementations, the values are received (e.g., streamed) in real-time from the sensor(s) 136, sent in batches, or received in any other suitable manner. In some implementations, the operating system 118 receives the value(s) via a hardware bus connected to the sensor(s) 136.

At 610, a determination may be made (e.g., by the operating system 118, and based on the value(s) of the sensed parameter(s) received at block 608) as to whether the sensed parameter is abnormal (e.g., relative to a baseline). Again, it is to be appreciated that the determination made at block 610 may include the computing device 102 sending the value(s) of the sensed parameter(s) to a remote computing system 104, and the computing device 102 receiving a response from the remote computing system 104, the response from the remote computing system 104 informing the computing device 102 as to whether a sensed parameter(s) is abnormal.

At 612, for example, the operating system 118 (or the remote computing system 104) may determine that a value of the sensed parameter(s) received at block 608 (e.g., a value of a series of values received at block 608) is not within (or is outside) a predetermined range of values 204(3) associated with a "normal" sensed parameter. For example, the operating system 118 (or the remote computing system 104) may receive a value of a temperature parameter, and by comparing the value to a predetermined range 316(1)/(2) of temperature values, the operating system 118 (or the remote computing system 104) may determine that the received value is not within (or is outside) the predetermined range 316(1)/(2) of temperature values. This may be done for values of other types of sensed parameters, such as a humidity parameter and/or a vibration parameter.

In some implementations, the operating system 118 (or the remote computing system 104) looks for corroborating signals to make the determination at block 610 (and/or block 612). For example, the operating system 118 (or the remote computing system 104) may determine an abnormality if a first value of a temperature parameter is outside a predetermined range of temperature values and a second value of a humidity parameter is outside a predetermined range of humidity values and a third value of a vibration parameter is outside a predetermined range of vibration values, at least within some threshold timeframe. In other words, if all three sensed parameters (e.g., temperature, humidity, and vibration) are measuring outside of predetermined value ranges 204(3) associate with a trusted location and/or use of the computing device 102, the determination may be made in the affirmative at block 610 (i.e., that the computing device 102 is being used in an untrusted way and/or location). In this scenario, if any of the three sensed parameters measure within a predetermined value range 204(3) associated with a trusted use and/or location of the computing device 102, the operating system 118 (or the remote computing system 104) may not have enough confidence to make the determination in the affirmative at block 610. In other implementations, other corroboration or confidence thresholds can be utilized, such as determining that at least two out of three sensed parameters measure outside of predetermined value ranges 204(3) associated with a trusted location and/or trusted use of the computing device.

In some implementations, the operating system 118 (or the remote computing system 104) may determine, as a corroborating signal, whether an Internet Protocol (IP) address associated with the computing device 102 has changed. This change in IP address may be indicative of the user 108 having moved the computing device 102 to another location, such as a public place with public WiFi access. In some implementations, the operating system 118 (or the remote computing system 104) may determine, as a corroborating signal, whether a sensed parameter(s) measures outside a predetermined value range 204(3) associated with a trusted use and/or location of the computing device 102 for longer than a threshold period of time and/or more than a threshold number of consecutive measurements. For example, if the temperature sensor 136(1) streams a series of values of a temperature parameter to the operating system 118 (which may be forwarded to the remote computing system 104), the operating system 118 (or the remote computing system 104) may wait to receive a threshold number of consecutive values of the temperature parameter that are outside a predetermined range 316(1)/(2) of values before determining that the computing device 102 is being used in an untrusted location. This may allow for ignoring transient spikes of anomalous parameter measurements.

To illustrate, a user 108 may work for quite some time from his/her home, and the temperature sensor 136(1) senses a series of temperature values that are fairly stable and within a predetermined range 316(1)/(2) of values. Subsequently, the temperature sensor 136(1) senses one or more values that are outside the predetermined range 316(1)/(2) of values, which is a risk signal that the user 108 may have changed their environment (e.g., by moving the computing device 102 somewhere else).

If, at 610, a determination is made (e.g., by the operating system 118 and/or the remote computing system 104, and based on the value(s) of the sensed parameter(s) received at block 608) that the sensed parameter(s) is/are not abnormal, the process 600 may follow the NO route from block 610 to block 604, where additional value(s) may be determined using the sensor(s) 136. If, on the other hand, a determination is made that the sensed parameter(s) is/are abnormal, the process 600 may follow the YES route from block 610 to block 614.

At 614, the processor(s) 112 may perform an action based at least in part on the determining that the sensed parameter(s) is/are abnormal. The operation(s) performed at block 614 may be similar to the operation(s) performed at block 520 of the process 500, and the operation(s) performed at sub-blocks 616-620 may be similar to the operation(s) performed at sub-blocks 522-526 of the process 500, except that the action(s) performed is based on determining that the value(s) of the sensed parameter(s) is/are abnormal (e.g., outside a predetermined range(s) of values). It is to be appreciated that the process 600 may be supplementary to the process 500 and performed in conjunction with the process 500 (e.g., in parallel with the process 500), and that the actions performed at 520 and 614 of the respective processes 500 and 600 may be the same action (e.g., sending a notification to a remote computing system 104). In this manner, the operating system may use the abnormal sensed parameter as a supplementary risk signal that something is amiss, in conjunction with detecting a connection of an untrusted external device using the process 500.

Figure 7:
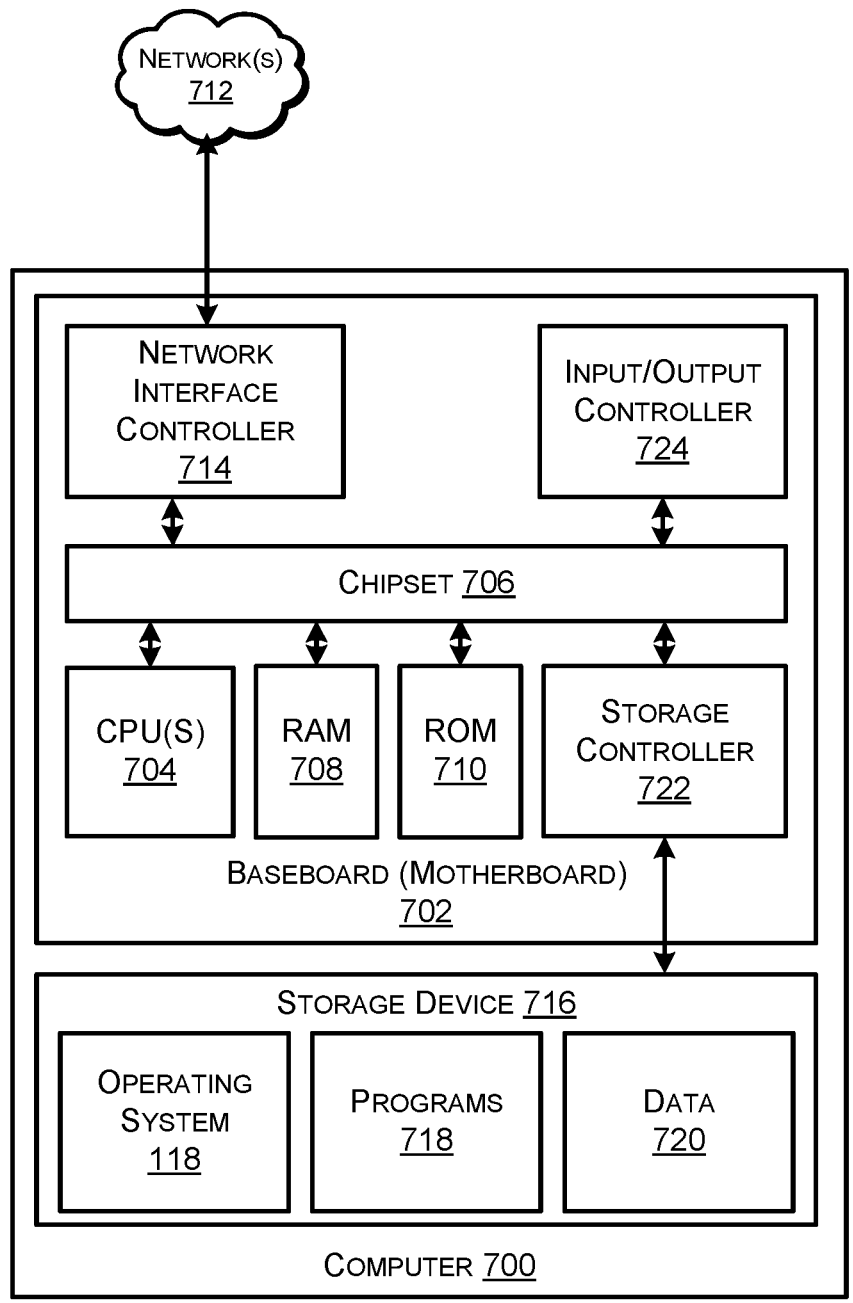
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional workstation, desktop computer, laptop, tablet, network appliance, e-reader, smartphone, server computer, or other computing device, and can be utilized to execute any of the software components presented herein.

The computer 700 includes a baseboard 702, or "motherboard," which is a printed circuit board (PCB) to which a multitude of components or devices can be connected by way of a system bus or other electrical communication paths. The baseboard 702 may be the same as, or similar to, the PCB 300 of FIG. 3. In one illustrative configuration, one or more central processing units ("CPUs") 704 operate in conjunction with a chipset 706. The CPUs 704 can be standard programmable processors that perform arithmetic and logical operations necessary for the operation of the computer 700, and the CPUs 704 may be the same as, or similar to, the processor(s) 112 of FIG. 1.

The CPUs 704 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may represent the "hardware bus" described above, and it can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 712. The chipset 706 can include functionality for providing network connectivity through a NIC 714, such as a gigabit Ethernet adapter. The NIC 714 may be the same as, or similar to, the communications interface(s) 116 of FIG. 1, and it is capable of connecting the computer 700 to other computing devices over the network 712. It should be appreciated that multiple NICs 714 can be present in the computer 700, connecting the computer to other types of networks and remote computer systems.

The computer 700 can be connected to a mass storage device 716 that provides non-volatile storage for the computer. The mass storage device 716 can store the operating system 118, programs 718, and data 720, to carry out the techniques and operations described in greater detail herein. The mass storage device 716 can be connected to the computer 700 through a storage controller 722 connected to the chipset 706. The mass storage device 716 can consist of one or more physical storage units. The storage controller 722 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 716 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 716 is characterized as primary or secondary storage, and the like.

For example, the computer 700 can store information to the mass storage device 716 by issuing instructions through the storage controller 722 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 716 by detecting the physical states or characteristics of one or more particular locations within the physical storage units.

In addition to the mass storage device 716 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

In one configuration, the mass storage device 716 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above. The computer 700 can also include computer-readable storage media storing executable instructions for performing any of the other computer-implemented operations described herein. Any of the computer-readable storage media depicted in FIG. 7 may be the same as, or similar to, the memory 114 of FIG. 1.

The computer 700 can also include one or more input/output controllers 724 for receiving and processing input from a number of input devices, such as a keyboard, a mouse, a touchpad, a touch screen, an electronic stylus, or other type of input device. Similarly, an input/output controller 724 can provide output to a display, such as a computer monitor, a flat-panel display, a digital projector, a printer, or other type of output device. It is to be appreciated that the computer 700 might not include all of the components shown in FIG. 7, can include other components that are not explicitly shown in FIG. 7, or can utilize an architecture completely different than that shown in FIG. 7.

Although the subject matter presented herein has been described in language specific to computer structural features, methodological acts, and computer readable media, it is to be understood that the appended claims are not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the following claims.

What is claimed is:

1. A computing device configured to access sensitive data of a service provider, the computing device comprising:
   one or more universal serial bus (USB) ports;
   one or more port meters, wherein each port meter of the one or more port meters corresponds to a corresponding USB port of the one or more USB ports, is electrically connected to the corresponding USB port, and is configured to measure an electrical parameter associated with the corresponding USB port;
   a sensor including at least one of a temperature sensor, a humidity sensor, or a vibration sensor;
   a processor; and
   memory storing computer-executable instructions that, when executed by the processor, cause performance of operations comprising:
      detecting that an external USB device is connected to a USB port of the one or more USB ports;
      periodically measuring, using a port meter corresponding to the USB port, the electrical parameter associated with the USB port to generate a series of first values of the electrical parameter;
      determining, using the sensor, a second value indicative of at least one of a temperature, a humidity, or a vibration associated with the computing device;
      receiving, by an operating system of the computing device, the series of first values and the second value;
      sending the series of first values and the second value to a remote computing system;
      receiving a response from the remote computing system;
      determining, based on the response indicating that the series of first values are outside of a first predetermined range of values associated with a trusted device and that the second value is outside of a second predetermined range of values, that an untrusted device is connected to the USB port; and
      performing an action based at least in part on the determining that the untrusted device is connected to the USB port.

2. The computing device of claim 1, wherein:
   the electrical parameter comprises an impedance parameter;
   the port meter is further configured to measure a voltage parameter associated with the USB port and a current parameter associated with the USB port; and
   the operations further comprise:
      periodically measuring, using the port meter, the voltage parameter and the current parameter associated with the USB port to generate a series of third values of the voltage parameter and a series of fourth values of the current parameter;
      receiving, by the operating system, the series of third values and the series of fourth values; and
      sending the series of third values and the series of fourth values to the remote computing system,
   wherein the response received from the remote computing system is received in response to the sending of the series of third values and the series of fourth values.

3. The computing device of claim 1, wherein the operations further comprise:
   establishing an authenticated computing session with the remote computing system, wherein the remote computing system maintains the sensitive data of the service provider, wherein the periodically measuring the electrical parameter associated with the USB port occurs during the authenticated computing session.

4. The computing device of claim 1, wherein the performing the action comprises at least one of:
disabling the computing device; or
disabling a component of the computing device.

5. A computing device comprising:
a hardware port configured to receive a connector of an external device;
a port meter that is electrically connected to the hardware port and configured to measure an electrical parameter associated with the hardware port;
a sensor including at least one of a temperature sensor, a humidity sensor, or a vibration sensor;
a processor; and
memory storing computer-executable instructions that, when executed by the processor, cause performance of operations comprising:
determining that the external device is connected to the hardware port;
periodically measuring, using the port meter, the electrical parameter to generate a series of first values of the electrical parameter, wherein the series of first values includes a first value;
determining, using the sensor, a second value indicative of at least one of a temperature, a humidity, or a vibration associated with the computing device;
receiving, by an operating system of the computing device, the first value and the second value;
sending, to a remote computing system, the first value and the second value;
receiving a response from the remote computing system;
determining, based at least in part on the response indicating that the first value is outside of a first predetermined range of values associated with a trusted device and that the second value is outside of a second predetermined range of values, that an untrusted device is connected to the hardware port; and
performing an action based at least in part on the determining that the untrusted device is connected to the hardware port.

6. The computing device of claim 5, wherein the electrical parameter comprises multiple electrical parameters including at least two of an impedance parameter, a voltage parameter, and a current parameter.

7. The computing device of claim 5, wherein the operations further comprise:
providing the first value as input to a trained machine learning model; and
generating, as output from the trained machine learning model, a probability that the untrusted device is connected to the hardware port,
wherein the determination is made based at least in part on the probability generated as the output from the trained machine learning model.

8. The computing device of claim 5, wherein the operations further comprise determining that the first value of the electrical parameter is within a third predetermined range of values associated with a known type of untrusted device, and wherein the determination is made based at least in part on the first value of the electrical parameter being within the third predetermined range of values.

9. The computing device of claim 5, wherein the performing the action comprises at least one of:
sending, to the remote computing system, a notification indicative of a connection of the untrusted device to the hardware port;
disabling the computing device; or
disabling a communications interface of the computing device.

10. The computing device of claim 5, further comprising a printed circuit board (PCB) internal to the computing device, and wherein the port meter comprises a computer chip mounted on the PCB adjacent the hardware port.

11. The computing device of claim 5, wherein the performing the action comprises at least one of:
disabling the computing device; or
disabling a component of the computing device.

12. The computing device of claim 5, wherein the operations further comprise:
prior to the determining that the external device is connected to the hardware port, periodically measuring, using the port meter, the electrical parameter at a first frequency; and
after the determining that the external device is connected to the hardware port, periodically measuring, using the port meter, the electrical parameter at a second frequency greater than the first frequency to generate the series of first values of the electrical parameter.

13. A method comprising:
determining that an external device is connected to a hardware port of a computing device;
periodically measuring, using a port meter that is associated with the computing device and that is electrically connected to the hardware port, an electrical parameter to generate a series of first values of the electrical parameter, wherein the series of first values includes a first value;
determining, using a sensor including at least one of a temperature sensor, a humidity sensor, or a vibration sensor, a second value indicative of at least one of a temperature, a humidity, or a vibration associated with the computing device;
receiving, by an operating system of the computing device, the first value and the second value;
sending, to a remote computing system, the first value and the second value;
receiving a response from the remote computing system;
determining, based at least in part on the response indicating that the first value is outside of a first predetermined range of values associated with a trusted device and that the second value is outside of a second predetermined range of values, that an untrusted device is connected to the hardware port; and
causing an action to be performed based at least in part on the determining that the untrusted device is connected to the hardware port.

14. The method of claim 13, wherein the electrical parameter comprises multiple electrical parameters including at least two of an impedance parameter, a voltage parameter, and a current parameter.

15. The method of claim 13, wherein the determining, based at least in part on the first value of the electrical parameter, that the untrusted device is connected to the hardware port comprises:
providing the value as input to a trained machine learning model; and generating, as output from the trained machine learning model, a probability that the untrusted device is connected to the hardware port.

16. The method of claim 13, further comprising:

determining, based at least in part on a communications interface of the computing device, an authenticated computing session between the computing device and the remote computing system, wherein the remote computing system maintains sensitive data of a service provider; and determining the first value of the electrical parameter during the authenticated computing session.

17. The method of claim 13, wherein the causing the action to be performed comprises at least one of:

causing the computing device to be disabled; or causing a component of the computing device to be disabled.

18. The method of claim 13, further comprising:

prior to the determining that the external device is connected to the hardware port, periodically measuring, using the port meter, the electrical parameter at a first frequency; and after the determining that the external device is connected to the hardware port, periodically measuring, using the port meter, the electrical parameter at a second frequency greater than the first frequency to generate the series of first values of the electrical parameter.

* * * * *